(12) United States Patent
Cao et al.

(10) Patent No.: US 6,490,386 B1
(45) Date of Patent: Dec. 3, 2002

(54) BIDIRECTIONAL OPTICAL AMPLIFIER

(76) Inventors: Xiaofan Cao, 44621 Gabrielino Ter., Fremont, CA (US) 94538; Thomas F. Cooney, 213 Summerfield Dr., Milpitas, CA (US) 95035

(*) Notice: Subject to any disclaimer, the term of this patent is extended or adjusted under 35 U.S.C. 154(b) by 101 days.

(21) Appl. No.: 09/773,224

(22) Filed: Jan. 31, 2001

(51) Int. Cl.[7] .................................................. G02B 6/28
(52) U.S. Cl. .......................... 385/24; 385/11; 385/36; 385/33; 359/129; 359/341
(58) Field of Search ............................. 385/24, 11, 37, 385/31, 33, 36, 48; 359/127, 129, 124, 130, 131, 123, 341

(56) References Cited

U.S. PATENT DOCUMENTS

| | | | |
|---|---|---|---|
| 6,205,270 B1 | * | 3/2001 | Cao ............................. 385/24 |
| 6,215,926 B1 | * | 4/2001 | Cao ............................. 385/36 |
| 6,263,129 B1 | * | 7/2001 | Cao ............................. 385/24 |
| 6,310,690 B1 | * | 10/2001 | Cao et al. .................... 356/519 |
| 6,333,798 B1 | * | 12/2001 | Allan et al. ................. 359/127 |
| 6,393,176 B1 | * | 5/2002 | Cao ............................. 385/24 |

* cited by examiner

Primary Examiner—Phan T. H. Palmer

(57) ABSTRACT

A bi-directional amplifier system comprises a 2×2 interleaved channel separator optically coupled to both a first and a second bi-directional fiber optic communications line and an optical amplifier optically coupled to the 2×2 interleaved channel separator. A method of bi-directional optical amplification comprises the steps of: (a) inputting a first plurality of optical channels from a first optical communications line to and a second plurality of optical channels from a second optical communications line to first port and a second port, respectively, of a 2×2 interleaved channel separator; (b) outputting the first plurality and the second plurality of optical channels from a third port of the interleaved channel separator to the input of an optical amplifier; (c) outputting the first plurality and the second plurality of optical channels from the output of the optical amplifier to a fourth port of the interleaved channel separator; and (d) outputting the first plurality of optical channels to the second fiber optic communications line and the second plurality of optical channels to the first fiber optic communication s line from the interleaved channel separator.

34 Claims, 20 Drawing Sheets

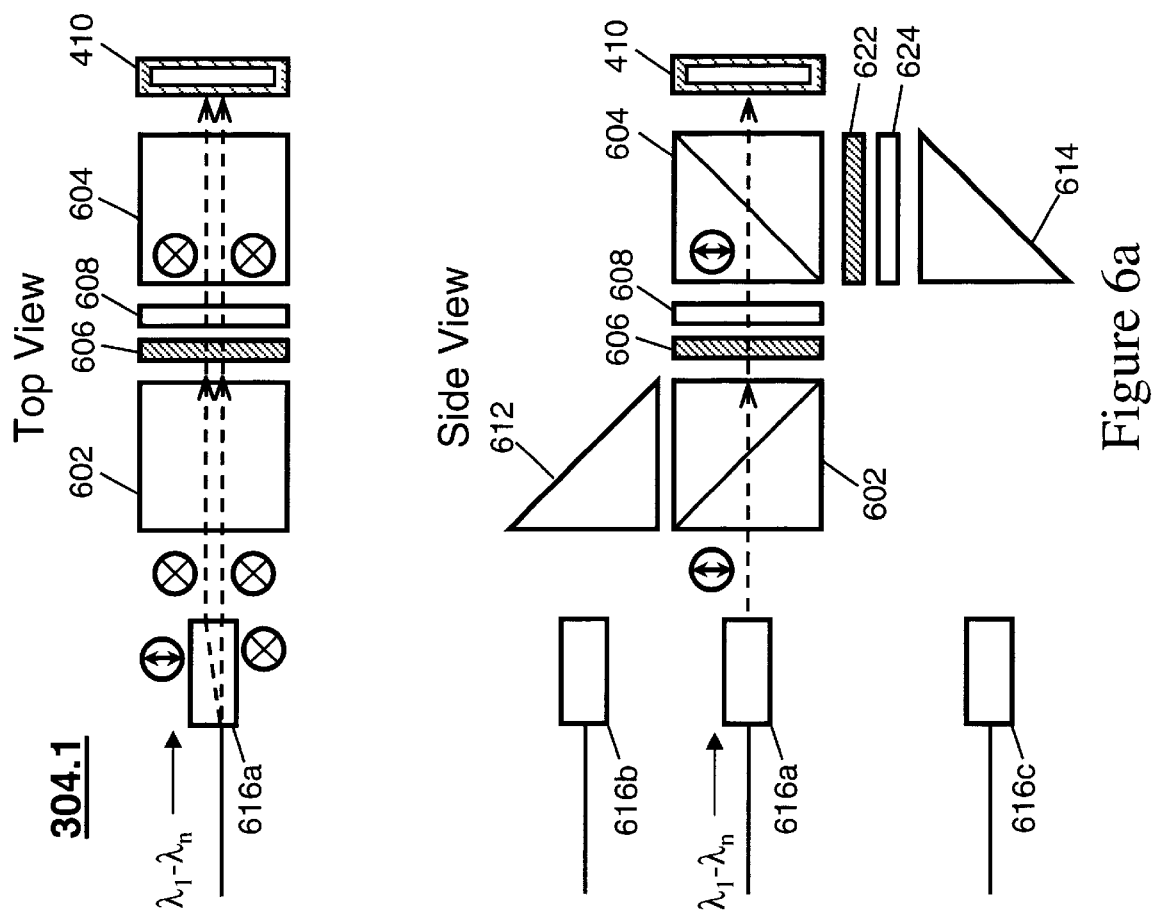

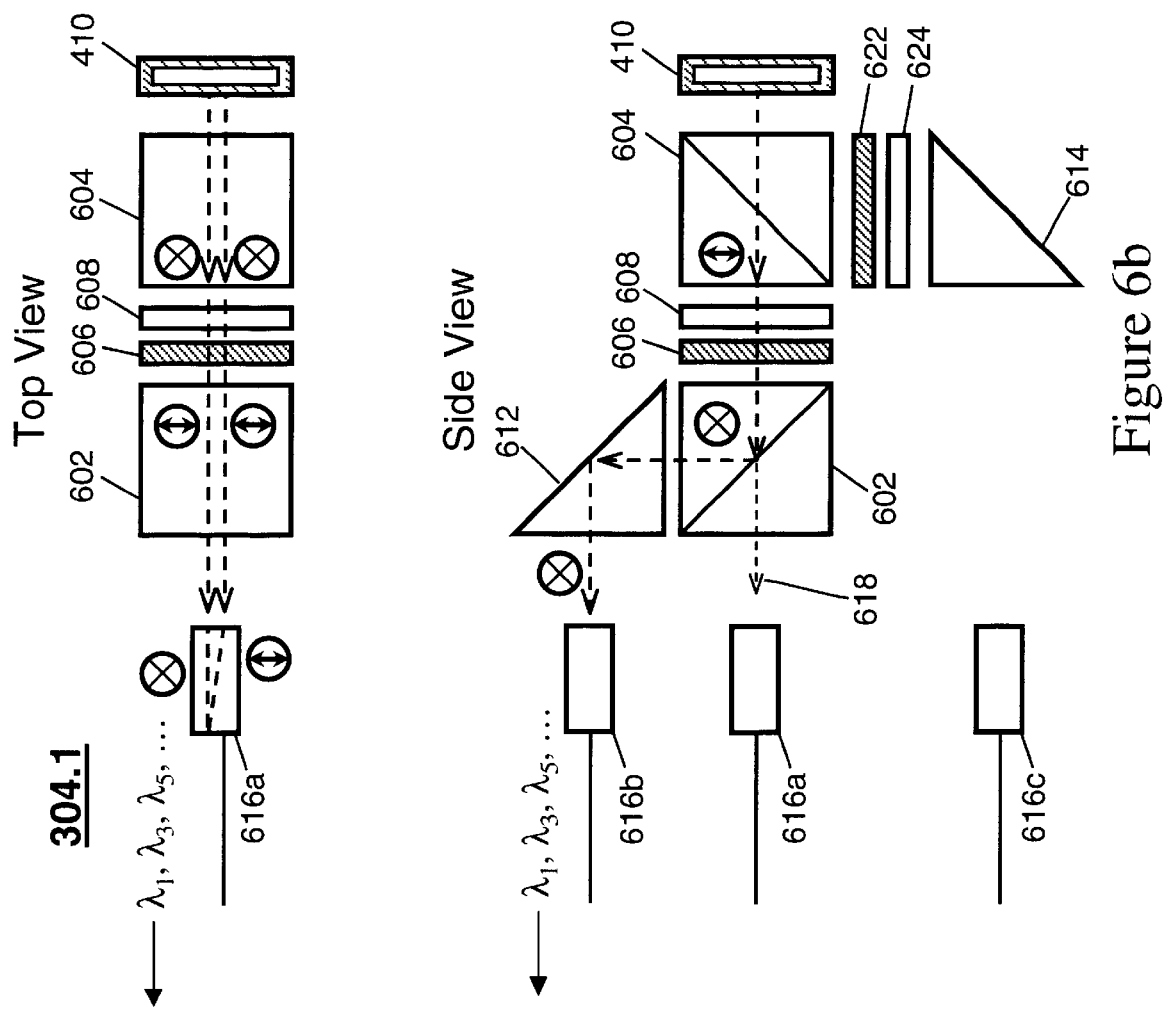

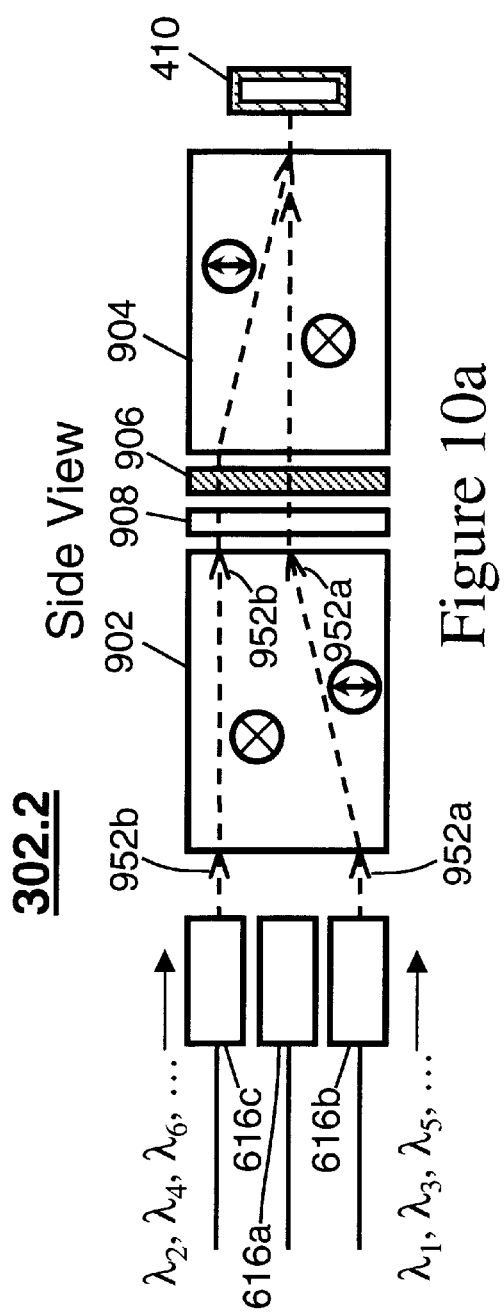
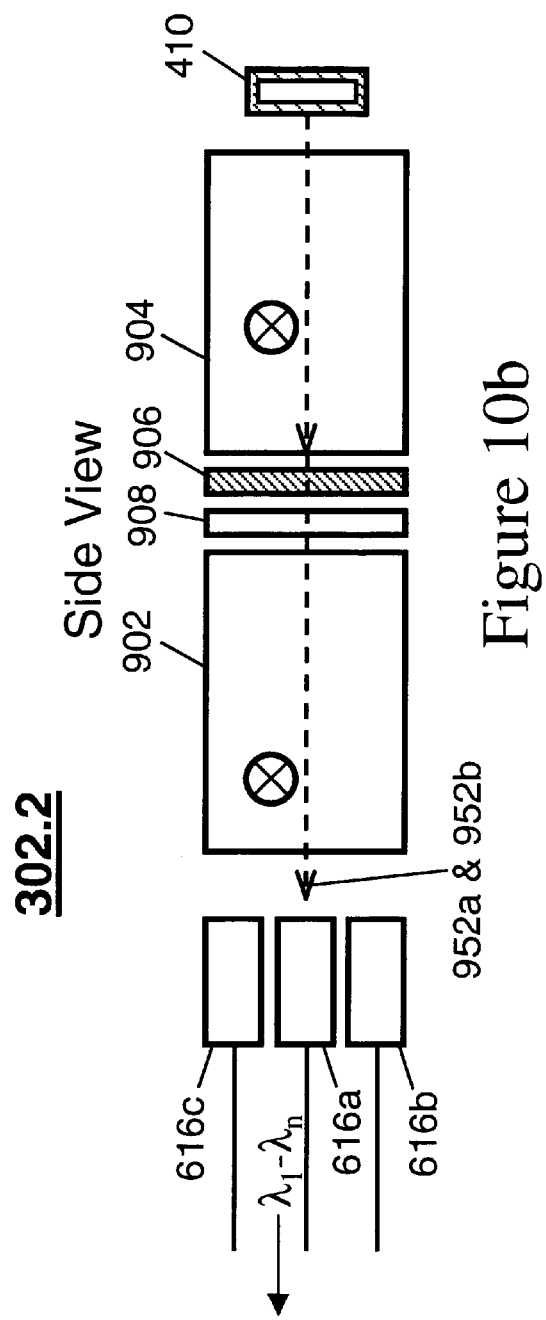
Figure 10a
Figure 10b

BIDIRECTIONAL OPTICAL AMPLIFIER

FIELD OF THE INVENTION

The present invention relates to optical amplifiers within wavelength division multiplexed optical communications systems. More particularly, the present invention relates to an optical amplifier system and a method for optical amplification within a wavelength division multiplexed optical communications system wherein a first plurality of optical signal channels propagate in a first direction and a second plurality of optical signal channels that are interleaved with the first plurality propagate in a second direction opposite to the first direction.

BACKGROUND OF THE INVENTION

Fiber optic communication systems are becoming increasingly popular for data transmission due to their high speed and high data capacity capabilities. Wavelength division multiplexing (WDM) is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, the individual information-carrying lights of a WDM system are referred to as either "signals" or "channels." The totality of multiple combined signals in a wavelength-division multiplexed optical fiber, optical line or optical system, wherein each signal is of a different wavelength range, is herein referred to as either a "composite optical signal" or simply as a "plurality of optical channels". Each information-carrying channel actually comprises light of a certain range of physical wavelengths within a band. However, for simplicity, an individual channel is often referenced to a single wavelength, $\lambda$, at the nominal center of the band. A plurality of such channels (i.e., a composite optical signal) are often denoted by a set of indexed wavelengths, such as "$\lambda_1 - \lambda_n$", or "$\lambda_1, \lambda_2, \lambda_3, \ldots$", etc.

Strictly speaking, a multiplexer is an apparatus which combines separate channels into a single wavelength division multiplexed composite optical signal and a de-multiplexer is an apparatus that separates a composite optical signal into one or more subsets of component channels. However, since many multiplexers and de-multiplexers ordinarily operate in either sense, the single term "multiplexer" is usually utilized to described either type of apparatus. Because of the nature of the present invention, however, the precise usage of the terms multiplexer and de-multiplexer is adhered to in this document—that is, as used in this document, a "multiplexer" (MUX) combines channels but does not operate in the reverse sense so as to separate channels and a "de-multiplexer" (DEMUX) separates channels but does not operate in the reverse sense so as to combine channels. An apparatus which can perform either channel separation or channel combining is referred to in this document as a "channel separator".

As the terms are used in this document, either a multiplexer or a channel separator may perform an interleaving function and either a de-multiplexer or a channel separator may perform a de-interleaving operation. An interleaving operation occurs when a first composite optical signal comprising a first plurality of optical channels is multiplexed together with a second composite optical signal comprising a second plurality of optical channels, wherein the first plurality of channels and the second plurality of channels are interleaved with one another. It is to be understood that the above stipulation that "the first plurality of channels and the second plurality of channels are interleaved with one another" means that the wavelengths (or frequencies) of the first plurality of optical channels are interleaved with the wavelengths (or frequencies) of the second plurality of optical channels. A de-interleaving operation is the opposite of an interleaving operation. Multiplexers, de-multiplexers and channel separators that perform interleaving or de-interleaving operations are herein referred to as interleaved channel multiplexers, interleaved channel de-multiplexers and interleaved channel separators.

An apparatus that performs a de-multiplexing operation is referred to herein as an "m×n de-multiplexer" where m is an integer representing the number of input ports, n is an integer representing the number of output ports and n≥m. An apparatus that performs a multiplexing operation is referred to herein as an "j×k multiplexer" where j is an integer representing the number of input ports, k is an integer representing the number of output ports and j≥k. Channel separator apparatuses are referred to herein as an "i×j channel separator" apparatuses where i is an integer representing the number of a first logical or physical group of ports, and j is an integer representing the number of a second logical or physical group of ports, wherein optical signals may propagate between the first and second groups but not between one port and another within an individual group.

It is desirable, within many fiber optic wavelength division multiplexed optical communications systems, for optical signals to be transmitted bi-directionally—that is, such that one or more first optical signals comprising a first wavelength or a first plurality of wavelengths are propagated in one direction whilst one or more second optical signals comprising either a second wavelength or a second plurality of wavelenghs are propagated in the opposite direction. Where optical signals propagate within a long transmission line, it is frequently necessary to amplify the bidirectional signals at intermediate points. Since the construction of most optical amplifiers only permits unidirectional optical transmission through the amplifier, it is thus necessary to interrupt the transmission path, route the two counter-propagating signals unidirectionally through the optical amplifier, and then return them to the transmission path to continue in their original, opposite directions of propagation. The temporary conversion of the counter-propagating signals into a combined unidirectional signal through the optical amplifier enables a single amplifier to be used, thereby saving expense and avoiding differences of amplification.

A prior-art bi-directional amplifier apparatus of this type is illustrated in FIG. 1. The prior-art apparatus 100 shown in FIG. 1 comprises a series of wavelength-selective devices 10, 12, 14 and 16, each having four ports designated P1, P2, P3 and P4, respectively. Each device comprises two graded-index one quarter pitch lenses disposed end-to-end with an optical bandpass filter sandwiched between their juxtaposed ends. Reference numbers utilized in FIG. 1 have the suffix "L" or "R" to identify whether it is at the right hand side or the left hand side, as shown. Thus, the left hand lenses of devices 10, 12, 14 and 16 are designated 10L, 12L, 14L and 16L, respectively, and the right hand lenses are designated 10R, 12R, 14R and 16R, respectively. The lenses are arranged so that light beams from each first port P1 will be collimated by the left-hand lens to illuminate substantially the whole of the corresponding bandpass filter and refocussed by the right-hand lens to couple into the opposite port P4—and vice versa. Likewise, light beams from the second port P2 will be collimated as they pass through the filter and refocussed to couple into the opposite third port P3—and vice versa. Where the collimated light beams from one port are reflected by the filter, they will be refocussed by the same lens but couple to the adjacent port.

Whereas the lenses are identical, each of the bandpass filters, designated 10F, 12F, 14F and 16F, respectively, will transmit a different band of wavelengths. The passbands of the bandpass filters 10F, 12F, 14F and 16F are designated $\Lambda_2$, $\Lambda_4$, $\Lambda_6$ and $\Lambda_N$, respectively. Each bandpass filter will pass light beams having a wavelength within its passband to couple to the opposite port and reflect light beams having a wavelength outside its passband so that they couple to the adjacent port. Light which passes through or is reflected from the optical band pass filter at the proper angle is refocused by the lens to a point sufficiently small to transfer the light from the lens couples into the fiber with minimum loss.

The first port P1 and the third port P3 of the first device 10 are connected to respective ends of first and second sections 18L and 18R of an optical fiber transmission line. The transmission line supports propagation of two groups of wavelength-division multiplexed (WDM) optical signals, one in each direction. In the drawing, even-numbered optical signals, designated as $\lambda_2$ through $\lambda_N$, propagate from right to left in the transmission line and odd-numbered optical signals $\lambda_1$ through $\lambda_M$ propagate from left to right. It should be noted that optical signal $\lambda_2$ will have a wavelength within the passband $\lambda_2$ of filter 10F, optical signal $\lambda_4$ will have a wavelength within the passband $\lambda_4$ of filter 12F, and so on. The four devices 10, 12, 14 and 16 are "chained" in that the second and fourth ports P2 and P4 of each of the first three devices 10, 12 and 14 are connected to the first and third ports P1 and P3, respectively, of the succeeding device. The second port P2 and fourth port P4 of the final device 16, however, are connected to the input port IN and output port OUT, respectively, of a unidirectional optical amplifier or other signal treatment equipment 20. The interconnections 22 between the various ports of the components may be optical fiber or any other suitable means.

In operation, the chain of four port devices 10–16 extract the two groups of WDM signals from the respective optical fiber sections 18L and 18R, and convert them into a single unidirectional set of signals which is supplied to the input port IN of the amplifier 20. When the unidirectional set of signals leave the output port OUT of the amplifier 20, the chain of devices convert them back into the original two groups of WDM signals and return each group to the other of the optical fiber sections 18L and 18R to continue propagating along the transmission line in the original direction.

Although the prior-art apparatus shown in FIG. 1 appears to be capable of performing its intended function, it possesses several drawbacks as a result of the potentially large number of optical filters and other components which must be utilized. The number of filters required in the prior-art apparatus 100 (FIG. 1) is equivalent to the number of channels in the set of channels—of the two counter-propagating sets—with the lesser number of channels. The potentially large number of filters utilized in the apparatus 100 leads to un-necessary complexity and bulk and to fabrication inefficiency and high fabrication cost. Since each optical signal interacts with—that is, passes through or is reflected from—each filter twice in its passage through the apparatus 100, the insertion loss may be great if several filters are utilized. Further, each one of the plurality of filters 10F, 12F, 14F, etc. must be pre-selected for optical performance characteristics, since each filter operates independently of all the others. Finally, filters of the type comprising the apparatus 100 are generally not available for inter-channel spacings less than approximately 100 GHz. This precludes the use of the prior-art apparatus for utilization with optical communications systems comprising more densely spaced channels.

Accordingly, there is a need for an improved bi-directional optical amplifier system. Such a system should have a minimal number of channel separation and re-combining stages so as to yield improved optical throughput, reduced size and less costly, more efficient fabrication than the conventional filter-based apparatus. Preferably, the improved apparatus should be capable of operating with inter-channel spacing of less than 100 GHz.

SUMMARY OF THE INVENTION

Accordingly, to address the above-described needs and drawbacks of the prior-art, an improved bi-directional optical amplifier system and a method for bi-directional optical amplification are herein disclosed. In a first embodiment, a bi-directional amplifier system in accordance with the present invention comprises a 2×2 interleaved channel separator optically coupled to both a first and a second bi-directional fiber optic communications line and an optical amplifier optically coupled to the 2×2 interleaved channel separator. A second embodiment of a bi-directional amplifier system in accordance with the present invention comprises a first and a second 1×2 interleaved channel separator optically coupled to a first and a second bi-directional fiber optic communications line, respectively, an optically isolating 2×1 interleaved channel multiplexer and an optically isolating 1×2 interleaved channel de-multiplexer optically coupled to both of the 1×2 interleaved channel separators and an optical amplifier optically coupled to both the optically isolating 2×1 interleaved channel multiplexer and to the optically isolating 1×2 interleaved channel de-multiplexer.

An interleaved channel separator suitable for use within a bi-directional amplifier system in accordance with the present invention comprises a plurality of ports, at least one of a first lens optically coupled to at least a first of the plurality of ports, at least one of a second lens optically coupled to at least a second of the plurality of ports, a polarization beam splitter optically coupled to the lenses and at least two nonlinear interferometers optically coupled to the polarization beam splitter. One form of an optically isolating interleaved multiplexer or de-multiplexer suitable for use within a bi-directional amplifier system in accordance with the present invention comprises a plurality of polarizing optical ports, a first and a second polarization beam splitter, a first non-reciprocal optical rotator and a first reciprocal optical rotator optically coupled between the first and the second polarization beam splitters, a second non-reciprocal optical rotator and a second reciprocal optical rotator optically coupled to the second polarization beam splitter, and a non-linear interferometer optically coupled to the second polarization beam splitter.

A method of bi-directional optical amplification of in accordance with the present invention comprises the steps of: (a) inputting a first plurality of optical channels from a first optical communications line to a first port and inputting a second plurality of optical channels from a second optical communications line to a second port of a 2×2 interleaved channel separator; (b) outputting the first plurality and the second plurality of optical channels from a third port of the 2×2 interleaved channel separator to the input of an optical amplifier; (c) outputting the first plurality and the second plurality of optical channels from the output of the optical amplifier to a fourth port of the 2×2 interleaved channel separator; and (d) outputting the first plurality of optical channels to the second fiber optic communications line from the second port of the 2×2 interleaved channel separator and outputting the second plurality of optical channels from the first port of the 2×2 interleaved channel separator to the first fiber optic communications line.

BRIEF DESCRIPTION OF THE DRAWINGS

The structure and functioning of a bi-directional optical amplifier system in accordance with the present invention will be more fully understood and appreciated from the following description and reference to the appended drawings, wherein:

FIG. 6a is a top view and a side view of a first optically isolating 1×2 interleaved channel de-multiplexer that may be utilized within an interleaved bi-directional optical amplifier system in accordance with the present invention showing the forward pathway of signal light rays of even and odd channels therethrough;

FIGS. 6b and 6c are each a top view and a side view of the optically isolating 1×2 interleaved channel de-multiplexer of FIG. 6a showing, respectively, the return pathways therethrough of signal light rays of odd channels and of even channels;

FIG. 10a is a side view of a second optically isolating 2×1 interleaved channel multiplexer that may be utilized within an interleaved bi-directional optical amplifier system in accordance with the present invention showing the forward pathways of signal light rays of odd and even channels therethrough;

FIG. 10b is a side view of the optically isolating 2×1 interleaved channel multiplexer of FIG. 10a showing the return pathways of signal light rays therethrough.

DETAILED DESCRIPTION OF THE INVENTION

The present invention provides an improved bi-directional optical amplifier system and a related method for bi-directional optical amplification. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the interleaved bi-directional optical amplifier apparatus of the present invention, the reader is referred to the appended FIGS. 2–10c in conjunction with the following description.

Figure 1:
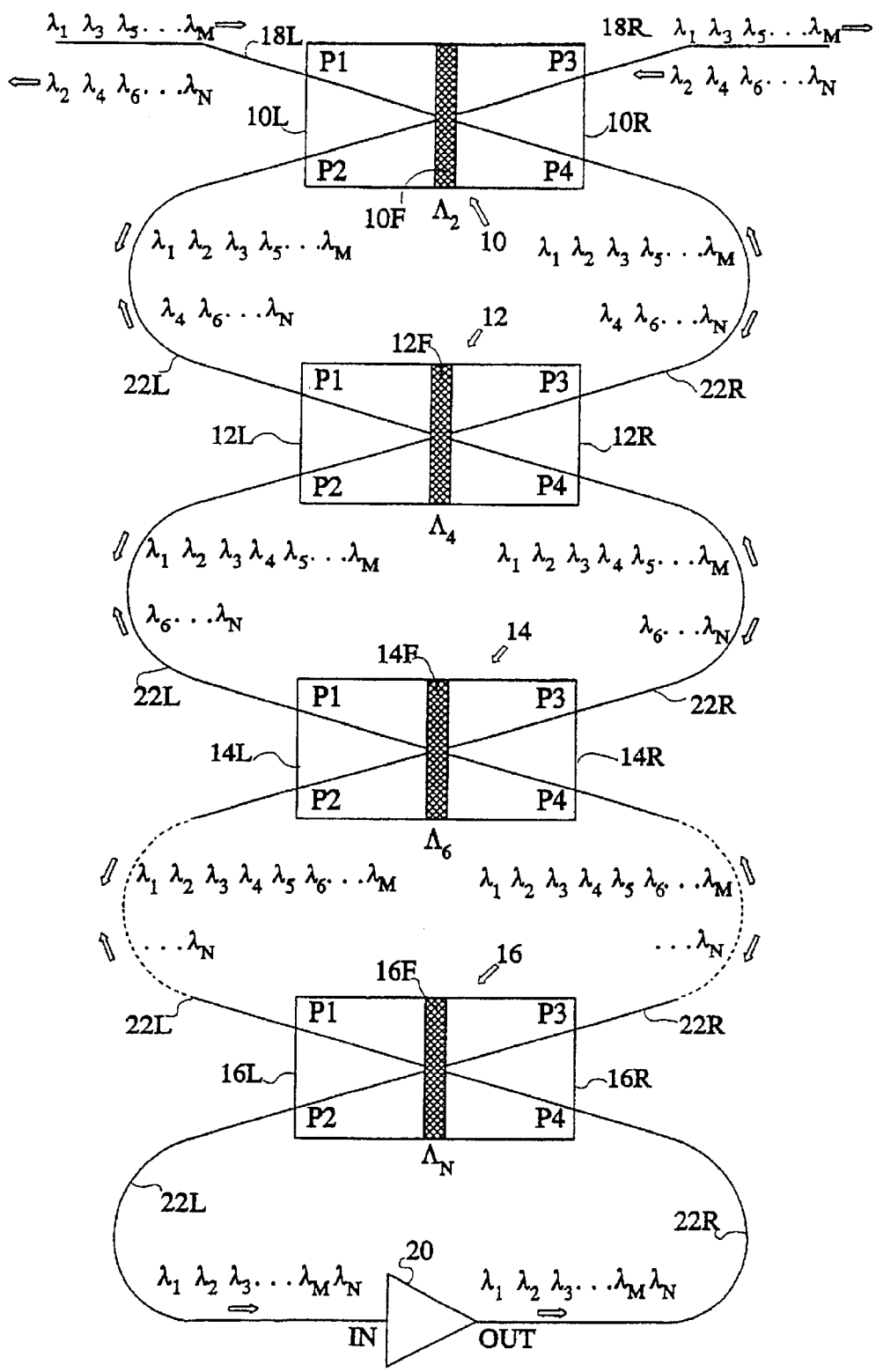
FIG. 1 is a schematic representation of a prior art apparatus comprising two sections of an optical transmission medium along which two groups of wavelength-division multiplexed signals propagate in opposite directions and a set of wavelength-selective devices for diverting the groups from the transmission line, routing them unidirectionally through an amplifier, and then returning them to the transmission line to continue propagating in their original opposite directions.
Figure 2:
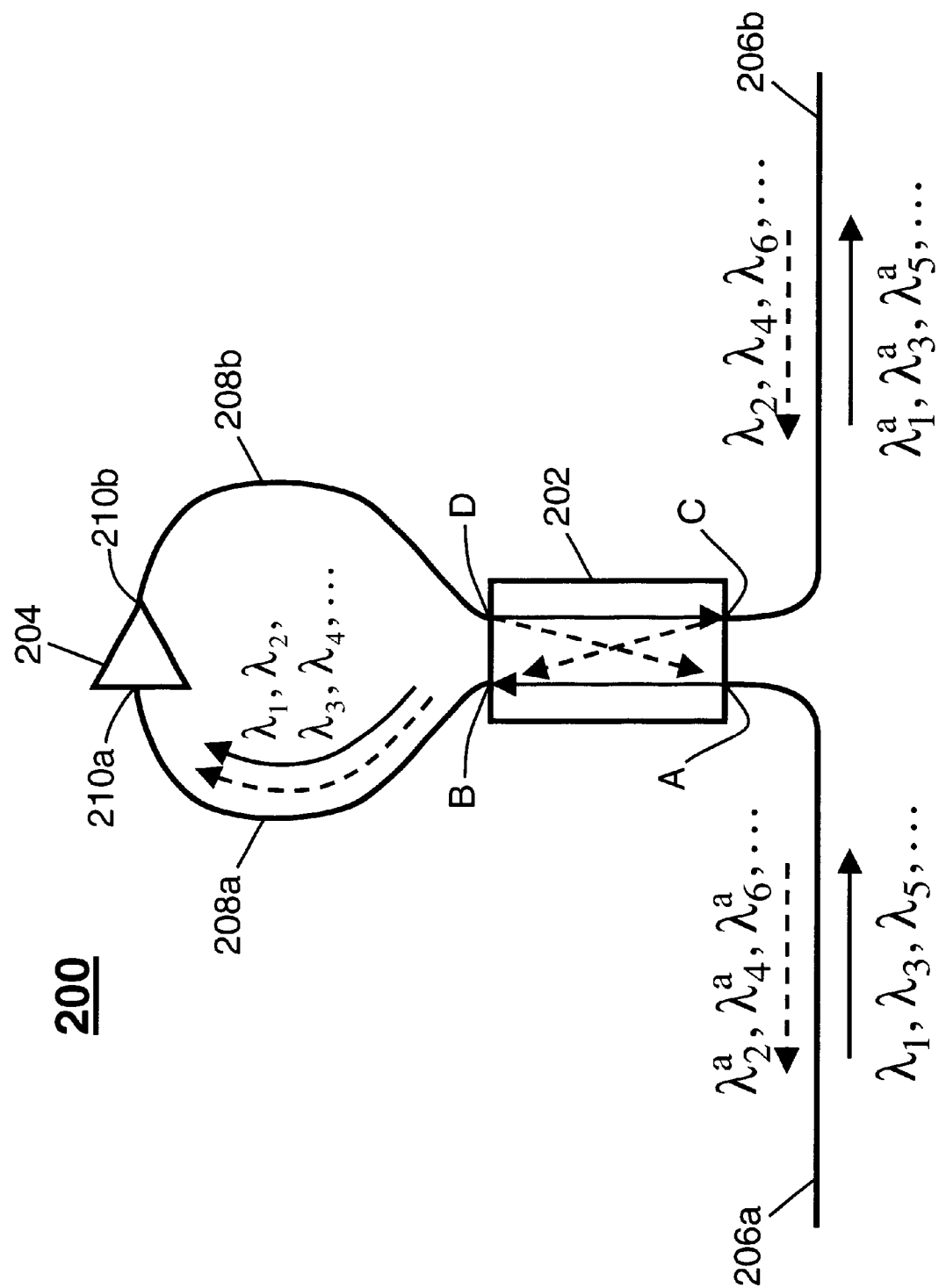
FIG. 2 is a schematic illustration of a first preferred embodiment of an interleaved bi-directional optical amplifier system in accordance with the present invention.
Figure 3A:
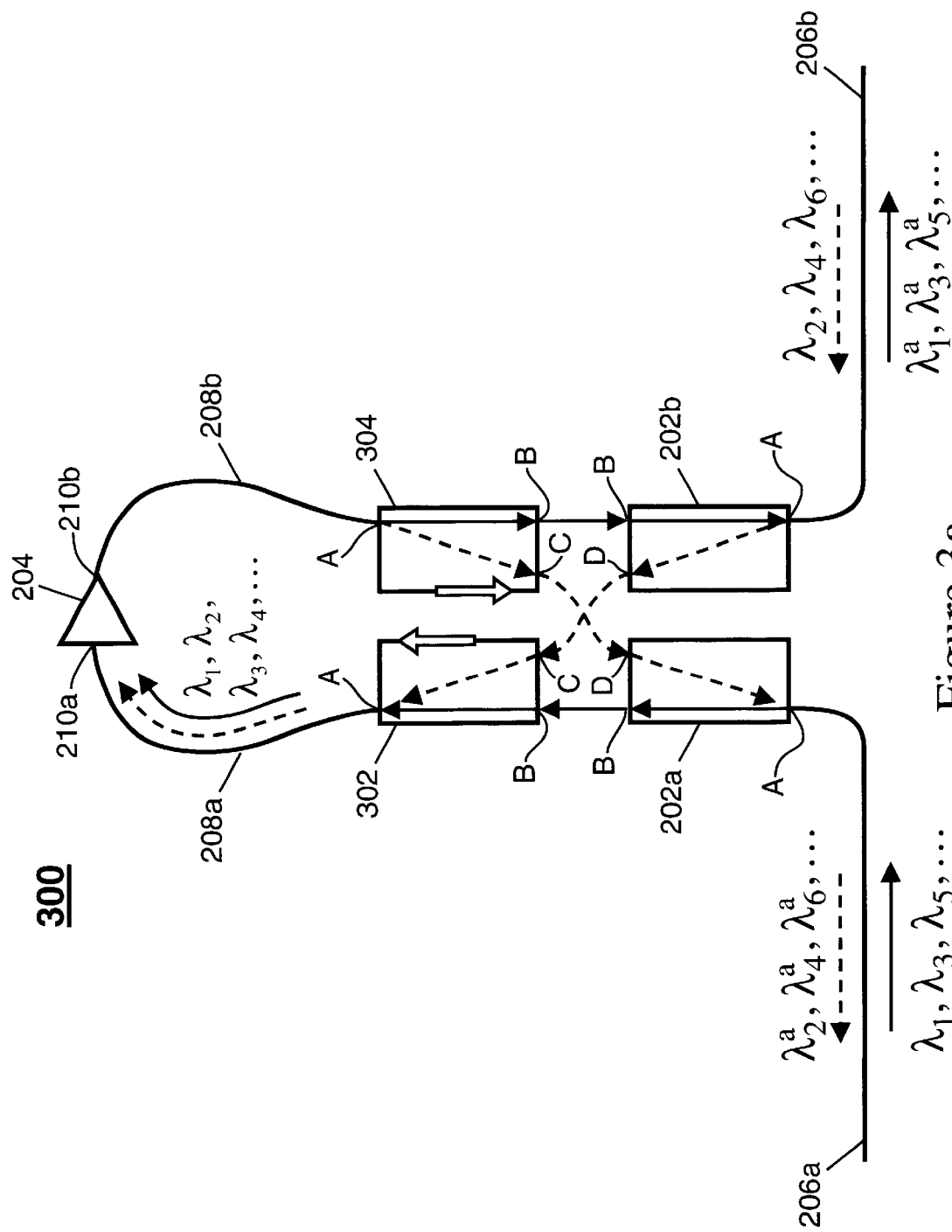
FIG. 3a is a schematic illustration of a second preferred embodiment of an interleaved bi-directional optical amplifier system in accordance with the present invention.
Figure 3B:
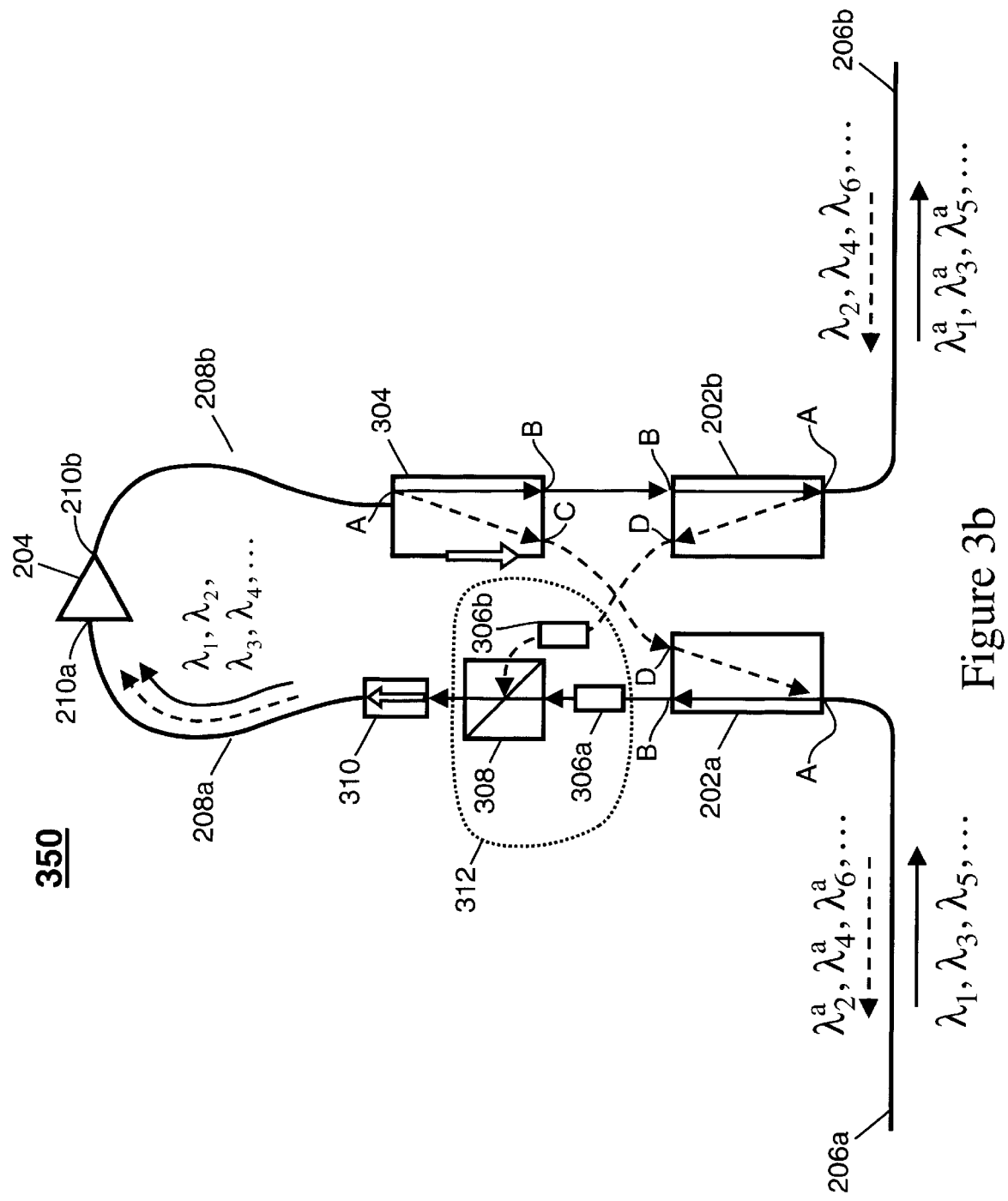
FIG. 3b is a schematic illustration of a third preferred embodiment of an interleaved bi-directional optical amplifier system in accordance with the present invention.

FIGS. 2, 3a and 3b respectively illustrate a first, a second and a third preferred embodiment of an interleaved bi-directional optical amplifier system in accordance with the present invention. The interleaved bi-directional optical amplifier system 200 (FIG. 2) comprises a 2×2 interleaved channel separator 202 comprising the four optical ports A–D; a first 206a and a second 206b bi-directional fiber optic communications line or system optically coupled to the port A and to the port D, respectively, of the 2×2 interleaved channel separator 202; an optical amplifier 204 comprising an input 210a and an output 210b, and a first 208a and a second 208b optical coupling device between the port B and the input of the optical amplifier and between the output of the optical amplifier and the port D. Preferably, each of the optical coupling devices 208a–208b comprises an optical fiber, but may comprise any alternative form of optical coupling such as one or more windows, planar waveguides, mirrors, prisms, etc., either alone or in combination.

Each of the bi-directional fiber optic communications lines or systems 206a–206b transmits a first plurality of channels in a first direction and transmits a second plurality of channels in a second direction opposite to the first direction, wherein the first plurality of channels is interleaved with the second plurality of channels. For example, within the system 200 illustrated in FIG. 2, the odd channels $\lambda_1$, $\lambda_3$, $\lambda_5$, . . . comprise a first plurality of channels transmitted from left to right and the even channels $\lambda_2$, $\lambda_4$, $\lambda_6$, . . . comprise a second plurality of channels transmitted from right to left within both fiber optic lines or systems 206a–206b. The odd channels and the even channels are interleaved with one another.

The set of odd channels $\lambda_1$, $\lambda_3$, $\lambda_5$, . . . is transmitted from the first bi-directional fiber optic communications line or system 206a to the port A of the 2×2 interleaved channel separator 202 and the set of even channels $\lambda_2$, $\lambda_4$, $\lambda_6$, . . . is transmitted from the second bi-directional fiber optic communications line or system 206b to the port C of the 2×2 interleaved channel separator 202. The 2×2 interleaved channel separator 202 functions such that the odd channels are routed from port A to port B and the even channels are routed from port C to port B. Thus, both the set of odd channels and the set of even channels are output together from the port B, from which they are routed to the input 210a of the optical amplifier 204 by the first optical coupling device 208a.

By the well-known operation of optical amplifiers, the optical amplifier 204 provides optical gain to each of the odd channels and to each of the even channels such that the signal carried by each such channel is intensified upon passing through the optical amplifier 204. The optical amplifier 204 may comprise a well-known type such as an Erbium-Doped Fiber Amplifier (EDFA) or a semiconductor optical amplifier. The amplified channels that are thus output from the output port 210b of the optical amplifier 204 are denoted as $\lambda_1^a$, $\lambda_2^a$, $\lambda_3^a$, $\lambda_4^a$, . . .

The amplified channels $\lambda_1^a$, $\lambda_2^a$, $\lambda_3^a$, $\lambda_4^a$, . . . are directed from the output port 210b of the optical amplifier 204 to the port D of the 2×2 interleaved channel separator 202 by the second optical coupling device 208b. The 2×2 interleaved channel separator 202 functions such that the amplified odd channels $\lambda_1^a$, $\lambda_3^a$, $\lambda_5^a$, . . . are routed from port D to port C whilst the amplified even channels $\lambda_2^a$, $\lambda_4^a$, $\lambda_6^a$, . . . are routed from port D to port A. Thus, the amplified odd channels $\lambda_1^a$, $\lambda_3^a$, $\lambda_5^a$, . . . are output from port C of the 2×2 interleaved channel separator 202 to the second fiber optic line or system 206b whilst the amplified even channels $\lambda_2^a$, $\lambda_4^a$, $\lambda_6^a$, . . . are output from port A of the 2×2 interleaved channel separator 202 to the first fiber optic line or system 206b.

FIG. 3a illustrates a second preferred embodiment of an interleaved bi-directional optical amplifier system in accordance with the present invention that is less susceptible to cross-talk than the system illustrated in FIG. 2. Cross-talk occurs when a proportion of the light of one set of channels (for instance, the even channels) "leaks" backward, upon exiting the optical amplification system, into a pathway nominally utilized for input of the other set of channels. For instance, in the system illustrated in FIG. 2, the amplified odd channels exiting from port C of the channel separator 202 are very intense but the even channels entering the system through the same port C are much weaker. A small proportion of leakage of the intense odd channels into the even-channel pathway from port C to port B of the channel separator could lead to undesirable cross-talk and to re-amplification of the leaked channels. To eliminate the possibility of such cross-talk, optical channels passing through the interleaved bi-directional optical amplifier system 300 shown in FIG. 3a are routed through a two-stage channel separator/multiplexer or de-multiplexer/channel separator combination. In such a configuration, any channels that may be leaked in the first stage are eliminated in the second stage.

The interleaved bi-directional optical amplifier system 300 (FIG. 3a) comprises several components in common with the bi-directional optical amplifier system 200 (FIG. 2). These common components comprise the first 206a and the second 206b bi-directional fiber optic communications line or system, the optical amplifier 204, and the first 208a and the second 208b optical coupling devices. However, in place of the single 2×2 interleaved channel separator utilized within the system 200 (FIG. 2), the interleaved bi-directional optical amplifier system 300 (FIG. 3a) comprises a pair of 1×2 interleaved channel separators 202a–202b, an optically isolating 2×1 interleaved channel multiplexer 302 and an optically isolating 1×2 interleaved channel de-multiplexer 304.

Each of the 1×2 channel separators 202a–202b comprises three ports—port A, port B and port D—wherein the port A is utilized for input of a first plurality of channels and for output of a second plurality of channels, the port B is utilized for input or output of the first plurality of channels and the port D is utilized for input or output of the second plurality of channels. The optically isolating 2×1 interleaved channel multiplexer 302 comprises three ports—port A, port B and port C—wherein the port A is utilized for output of both the first and second pluralities of channels, the port B is utilized for input of the first plurality of channels and the port C is utilized for the input of the second plurality of channels. The optically isolating 1×2 interleaved channel de-multiplexer 304 comprises three ports—port A, port B and port C—wherein the port A is utilized for input of both the first and second pluralities of channels, the port B is utilized for output of the first plurality of channels and the port C is utilized for the output of the second plurality of channels.

According to the operation of the optically isolating 2×1 interleaved channel multiplexer 302 comprising the interleaved bi-directional optical amplifier system 300 (FIG. 3a), optical channels are prevented from propagating from port A to either port B or port C within the optically isolating 2×1 interleaved channel multiplexer 302. Likewise, according to the operation of the optically isolating 1×2 interleaved channel de-multiplexer 304, optical channels are prevented from propagating from either port B or port C to port A within the optically isolating 1×2 interleaved channel de-multiplexer 304.

The optical isolation capabilities of the multiplexer 302 within the interleaved bi-directional optical amplifier system 300 prevent unwanted back propagation of optical signals, after amplification by the optical amplifier 204, in an incorrect direction—that is from port A of the interleaved channel multiplexer 302 back to either or both of the interleaved channel separators 202a–202b. Such back-propagation of amplified signals would otherwise result in the undesirable situations in which amplified "even" channels propagate from left-to-right within the second fiber optic communications line or system 206b or in which amplified "odd" channels propagate from right-to-left within the first fiber optic communications line or system 206a. The optical isolation capabilities of the multiplexer 304 within the interleaved bi-directional optical amplifier system 300 prevent unwanted amplification of any optical signals that inadvertently propagate in an incorrect direction through either of the fiber optic communications lines or systems 206a–206b.

Within the interleaved bi-directional optical amplifier system 300, the ports D of the 1×2 channel separators 202a–202b are optically coupled to the two ports C of the optically isolating 2×1 interleaved channel multiplexer 302 and the optically isolating 1×2 interleaved channel de-multiplexer 304 as illustrated in FIG. 3a. As further shown in FIG. 3a, the output from port B of the first 1×2 interleaved channel separator 202a is directed to the input port B of the optically isolating 2×1 interleaved channel multiplexer 302 and the output from port B of the optically isolating 1×2 interleaved channel de-multiplexer 304 is directed to the port B of the second 1×2 interleaved channel separator 202b. The first optical coupling device 208a couples the output port—port A—of the optically isolating 2×1 interleaved channel multiplexer 302 to the input 210a of the optical amplifier 204. The second optical coupling device 208b couples the input port—port A—of the optically isolating 1×2 interleaved channel de-multiplexer 304 to the output 210a of the optical amplifier 204. Each of the two 1×2 interleaved channel separators 202a–202b may comprise the 2×2 interleaved channel separator apparatus 202 shown in FIG. 2 wherein the port C of the apparatus 202 is either absent or not utilized.

In operation of the interleaved bi-directional optical amplifier system 300 shown in FIG. 3a, the set of odd channels $\lambda_1, \lambda_3, \lambda_5, \ldots$ is transmitted from the first bi-directional fiber optic communications line or system 206a to the port A of the first 1×2 interleaved channel separator 202a and the set of even channels $\lambda_2, \lambda_4, \lambda_6, \ldots$ is transmitted from the second bi-directional fiber optic communications line or system 206b to the port A of the second 1×2 interleaved channel separator 202b. According to the operation of the 1×2 interleaved channel separators 202a–202b, the odd channels are routed from port A to port B within the first 1×2 interleaved channel separator 202a and the even channels are routed from port A to port D within the second 1×2 interleaved channel separator 202b. The odd channels and the even channels are subsequently directed to the port B and the port C, respectively, of the optically isolating 2×1 interleaved channel multiplexer 302. The optically isolating 2×1 interleaved channel multiplexer 302 then combines the set of odd channels and the set of even channels into a single output that exits from the port A of the optically isolating 2×1 interleaved channel multiplexer 302 and is routed to the input 210a of the optical amplifier 204.

The optical amplifier 204 outputs the amplified channels $\lambda_1^a, \lambda_2^a, \lambda_3^a, \lambda_4^a, \ldots$, which are directed from the output port 210b to the port A of the optically isolating 1×2 interleaved channel de-multiplexer 304 by the second optical coupling device 208b. According to the operation of the optically isolating 1×2 interleaved channel de-multiplexer 304, the amplified even channels $\lambda_2^a, \lambda_4^a, \lambda_6^a, \ldots$ are separated from the amplified odd channels $\lambda_1^a, \lambda_3^a, \lambda_5^a, \ldots$ wherein the amplified even channels are output from the port C and the odd channels are output from the port B of the optically isolating 1×2 interleaved channel de-multiplexer 304. The amplified even channels are then directed to port D of the first 1×2 interleaved channel separator 202a and the amplified odd channels are then directed to port B of the second 1×2 interleaved channel separator 202b. According to the operation of the first 1×2 interleaved channel separator 202a, the amplified even channels are directed from port D to port A so as to be output to the first fiber optic communications line or system 206a. According to the operation of the second 1×2 interleaved channel separator 202b, the amplified odd channels are directed from port B to port A so as to be output to the second fiber optic communications line or system 206b.

FIG. 3b illustrates a third preferred embodiment of an interleaved bi-directional optical amplifier system in accordance with the present invention. The interleaved bi-directional optical amplifier system shown in FIG. 3b is largely similar to the system 300 (FIG. 3a) but is suitable for use when the sophisticated multiplexing and cross-talk inhibiting properties of the optically isolating 2×1 interleaved channel multiplexer 302 are not required. In the system 350 (FIG. 3b), the multiplexer 302 is replaced by a simple conventional optical combiner 312 and an optional conventional optical isolator 310. Other components are common between the system 300 (FIG. 3a) and the system 350 (FIG. 3b). The optional optical isolator 310 is not required if the amplifier 204 comprises its own internal optical isolation capabilities.

An optical combiner, as utilized within the bi-directional optical amplifier system 350 (FIG. 3b), receives two separate optical inputs and combines these into a single optical output comprising light from each of the inputs. A combiner differs from a multiplexer because, in contrast to a multiplexer, the combination is performed without regard to wavelength. Many examples of conventional optical combiners are known. For instance the optical combiner 312 may comprise a conventional optical coupler.

One preferred configuration of an optical combiner, as illustrated in FIG. 3b, utilizes two polarizers 306a–306b and a polarization beam splitter 308. The polarizer 306a imposes a linear polarization state upon the odd channels received from port B of the first interleaved channel separator 202a. The polarizer 306b imposes a linear polarization state upon the even channels received from port D of the second interleaved channel separator 202b, such that the polarizations of the even channels and of the odd channels are complementary to one another upon input to the polarization beam splitter. The polarization beam splitter 308 combines the channels from the first polarized input together with the channels from the second, complementary polarized input such that the channels from both inputs are combined into a single output which is then delivered to the optical isolator 310 and/or to the input 210a of the optical amplifier 204. This operation of polarization beam splitters is well known.

The polarizers 306a–306b could comprise any conventional polarizer but preferably comprise polarizing ports of the type shown in FIG. 7 and described in more detail in the following description. The polarization beam splitter 308, although illustrated as a "cube" beam splitter in FIG. 3b, could also comprise a birefrinent walk-off plate, wherein the first polarized input comprises an e-ray and the second, complementary polarized input comprises an o-ray such that the channels from both inputs are combined into a single output upon passing through and exiting the birefringent walk-off plate. This operation of birefringent walk-off plates is described in more detail in the following discussion.

Figure 4:
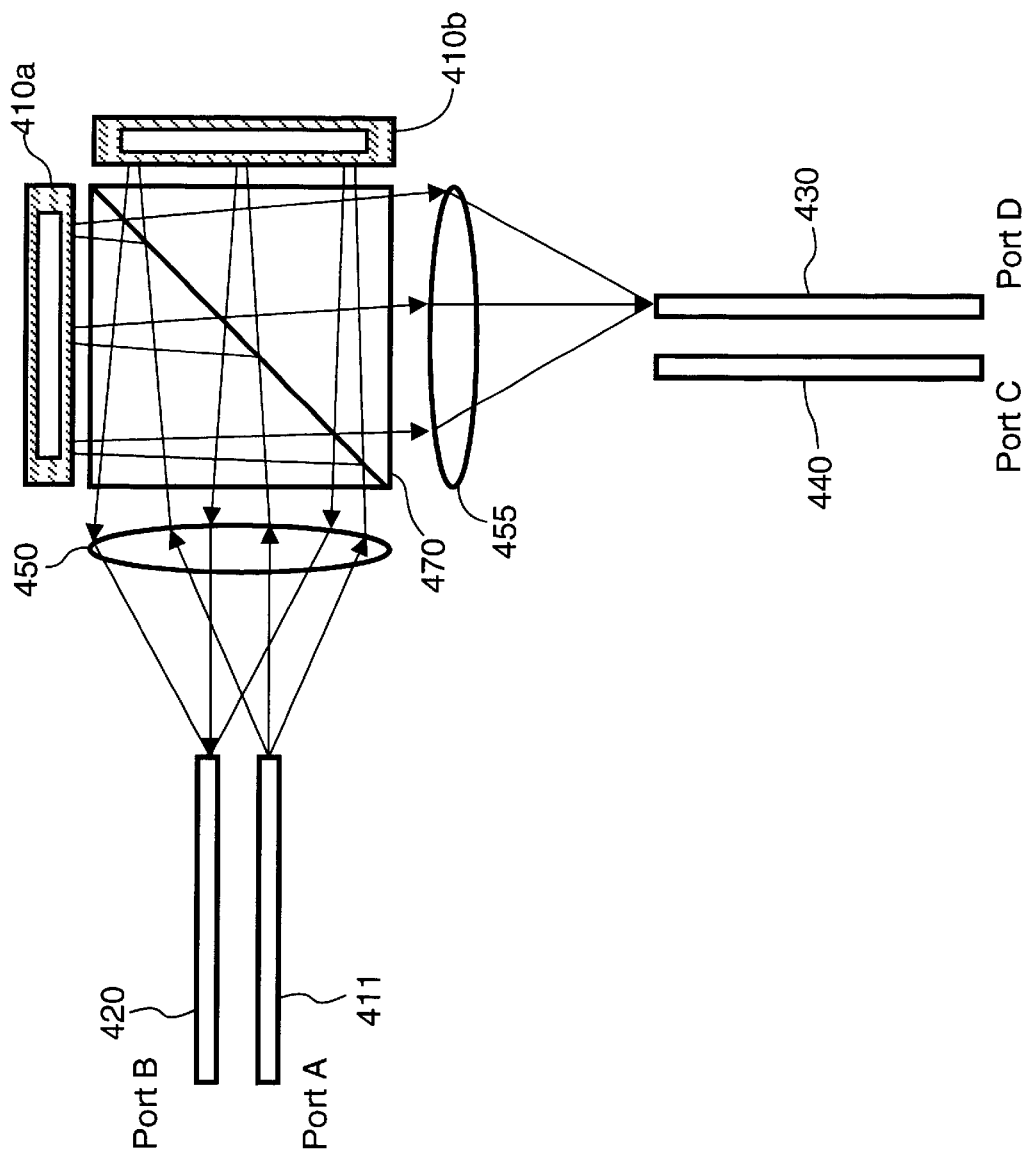
FIG. 4 is a side view of an interleaved channel separator that may be utilized within the preferred embodiments of an interleaved bi-directional optical amplifier system in accordance with the present invention.

FIG. 4 is an illustration of a 2×2 interleaved channel separator device 202 that is suitable for use within the interleaved bi-directional optical amplifier system 200 (FIG. 2). The interleaved channel separator 202, shown in FIG. 4, is disclosed in U.S. Pat. No. 6,130,971 and in U.S. Pat. No. 6,169,828, both of which are assigned to the current applicant and which are incorporated herein by reference in their entirety. The 2×2 interleaved channel separator 202 (FIG. 4) comprises a first input optical fiber 411 and a second input optical fiber 440 for inputting optical signals and first 420 and second 430 output optical fibers for outputting optical signals. As an input composite optical signal leaves the first input optical fiber 411, it diverges. A first lens 450 collimates the input composite optical signal and directs it toward a polarization beam splitter 470 which decomposes the signal into two sub-signals having mutually orthogonal polarizations. The s-polarized portion of the input composite optical signal polarized parallel to a plane in the polarization beam splitter 470 is reflected towards a first non-linear interferometer interferometer 410a. The p-polarized portion of the signal polarized perpendicularly to the plane in the polarization beam splitter 470 passes through towards a second non-linear interferometer interferometer 410b.

Each of the non-linear interferometers 410a and 410b has the property such that, if the light beam reflected therefrom is an optical signal comprised of a plurality of wavelength division multiplexed channels and the light of each channel is linearly polarized, then the light of a first set of channels (for instance the "even" channels) is reflected with a 90° rotation of its polarization plane direction whilst the light of the remaining set of channels (for instance, the "odd" channels) is reflected with unchanged polarization. When light is input from the first input optical fiber 411 as shown in FIG. 4, the light comprising the set of channels whose polarization is rotated (the even channels, in this example) is directed through the second lens 455 to the second output optical fiber 430 and the light comprising the other set of channels (the odd channels, in this example) is directed through the first lens 450 to the first output optical fiber 420. When light is input from the second input optical fiber 440, the light comprising the set of channels whose polarization is rotated is directed to the first output optical fiber 420 and the light comprising the other set of channels is directed to the second output optical fiber 430. Furthermore, the operation of the 2×2 interleaved channel separator 202 is completely reversible—that is, odd channels and even channels input from fiber 420 and from fiber 430, respectively, will be directed to the fiber 411 and even channels and odd channels input from the fiber 420 and from the fiber 430, respectively, will be directed to the fiber 440. It may be noted from the above description that, if fiber 411 is defined as Port A, fiber 420 is defined as Port B, fiber 430 is defined as Port D and fiber 440 is defined as Port C, then the apparatus 202 functions as shown by the solid and dashed arrows indicated on FIG. 2. Other apparatuses that may be utilized as the 2×2 interleaved channel separator 202 are disclosed in the following co-pending U.S. patent applications, all assigned to the present applicant and incorporated herein by reference in their entirety: "Fiber Optic Wavelength Division Multiplexer With a Phase Differential Method of Wavelength Separation Utilizing Glass Blocks and a Nonlinear Interferometer", Ser. No. 09/248,021, filed Feb. 10, 1999; "High-Isolation Dense Wavelength Division Multiplexer Utilizing a Polarization Beam Splitter, Non-Linear Interferometers and Birefringent Plates", Ser. No. 09/348,752, filed Jul. 6, 1999; and "High-Isolation Dense Wavelength Division Multiplexer Utilizing Birefringent Plates and a Non-Linear Interferometer", Ser. No. 09/404,005, filed Sep. 23, 1999.

Figure 5:
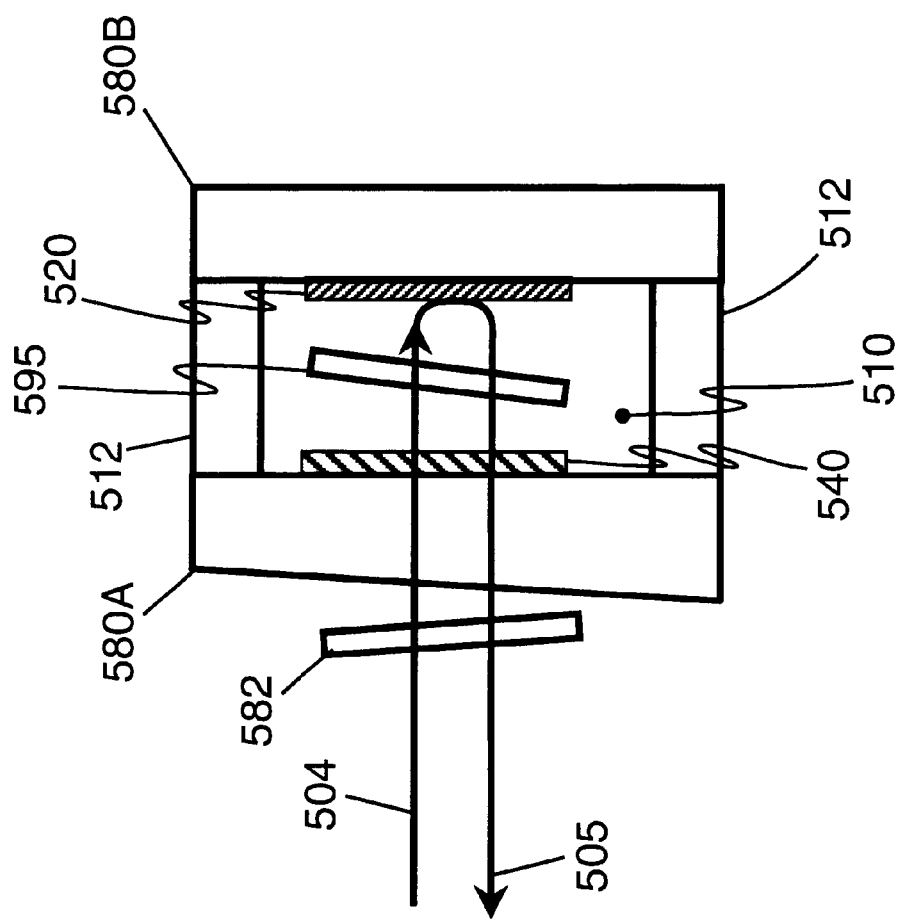
FIG. 5 is an illustration of a non-linear interferometer that may be utilized within an interleaved channel separator apparatus or within an optically isolating interleaved channel multiplexer or de-multiplexer comprising an interleaved bi-directional optical amplifier system in accordance with the present invention.

FIGS. 5 illustrates a structure of a non-linear interferometer 410 as utilized within the 2×2 interleaved channel separator 202. The non-linear interferometer 410 (FIG. 5) is disclosed in U.S. Pat. No. 6,169,604, assigned to the present applicant and incorporated herein by reference in its entirety. Further details of the non-linear interferometer 410 are disclosed in a co-pending U.S. Patent Application, assigned to the present applicant, entitled "Dense Wavelength Division Multiplexer Utilizing an Asymmetric Pass Band Interferometer" Serial No. 09/388,350, filed Sep. 1, 1999. Applicant incorporates this patent application herein by reference in its entirety.

The non-linear interferometer 410 (FIG. 5) comprises two glass plates 580A–580B optically coupled to one another, wherein the first glass plate 580A comprises a wedge shape. The inside face of the second glass plate 580B is coated with a layer of reflective coating 520 with a reflectivity preferably of 100%. The inside face of the first glass plate 580A is substantially parallel to face 580B and is coated with a layer of a partially reflective coating 540 with a reflectivity less than 100%. The two glass plates are separated by spacers 512, such that an interferometric cavity 510 is created between the partially reflective coating 540 and the 100% reflective coating 520. The spacers 512 preferably comprise a zero-thermal-expansion or low-thermal-expansion material. The non-linear interferometer 410 further comprises a first birefringent waveplate 582 disposed external to the cavity 510 and optically coupled to the glass plate 580A and a second birefringent waveplate 595 disposed within the cavity 510 and optically coupled to the glass plate 580A. An input linearly polarized light 504 comprised of multiple channels is reflected as light 505, wherein the polarization of a first set of channels is rotated and the polarization of a second set of channels interleaved with the first set of channels is not rotated.

As described in more detail in the aforementioned co-pending U.S. Patent Application entitled "Dense Wavelength Division Multiplexer Utilizing an Asymmetric Pass Band Interferometer", the reflectivity, $r_1$, of the partially reflective coating 540 and the optical retardance (or retardation), $L_1$, of the external waveplate 582 and the optical retardance, $L_2$, of the internal waveplate 595, may be independently varied so as to vary the optical properties of the non-linear interferometer. Specifically, when $L_1=\lambda/8$, $L_2=\lambda/4$ and $r_1=18.5\%$, then the channels comprising the rotated polarization light and the set of channels comprising the non-rotated polarization light have similar spectral bandwidths. In another example, when $L_1=3\lambda/16$, $L_2=\lambda/8$ and $r_1=32.5\%$, then the channels comprising the rotated polarization light and the set of channels comprising the non-rotated polarization light have spectral bandwidths that are in a ratio of 3:1 (or 1:3). In yet another example, when $L_1=7\lambda/32$, $L_2=\lambda/16$ and $r_1=56.3\%$, then the channels comprising the rotated polarization light and the set of channels comprising the non-rotated polarization light have spectral bandwidths that are in a ratio of 7:1 (or 1:7). In each case the first and second sets of channels are interleaved with one another.

FIGS. 6a–6d provide an illustration of a first optically isolating 1×2 interleaved channel de-multiplexer 304.1 that may be utilized within the interleaved bidirectional optical amplifier system 300 (FIG. 3a) or the interleaved bi-directional optical amplifier system 350 (FIG. 3b). The optically isolating 1×2 interleaved channel de-multiplexer 304.1 is disclosed in a co-pending U.S. Patent Application assigned to the present applicant entitled "Multi-Functional Optical Device Utilizing Multiple Polarization Beam Splitters and Non-Linear Interferometers", Ser. No. 09/630,891, filed Aug. 2, 2000. Applicant incorporates this co-pending patent application herein by reference in its entirety.

Figure 6C:
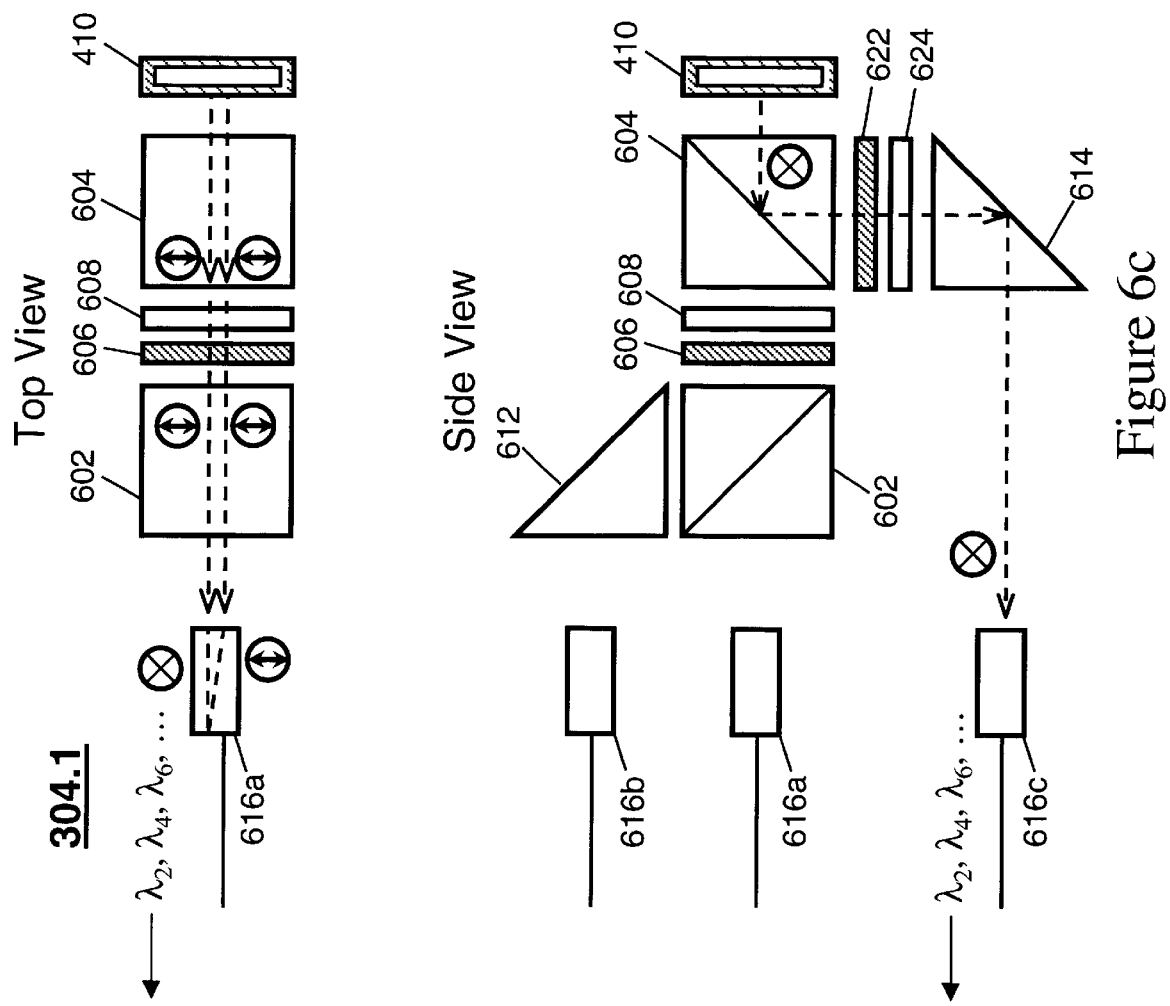

As will become apparent from the following discussion, the optically isolating 1×2 interleaved channel de-multiplexer 304.1 (FIGS. 6a–6d) receives input from a first optical port 616a and separates the channels therein into a first set of channels and a second set of channels that are output from a first output optical port 616b and a second output optical port 616c, respectively. For reasons further detailed below, the optical ports 616a–616c are also referred to herein as polarizing ports. As shown in FIG. 6a, the optically isolating 1×2 interleaved channel de-multiplexer 304.1 comprises a first 602 and a second 604 polarization beam splitter (PBS) between which are disposed a pair of optical rotators comprising a first non-reciprocal optical rotator 606 and a first reciprocal optical rotator 608. The first PBS 602 receives optical input from the input port 616a which is disposed adjacent to a side of the PBS 602 opposite to the non-reciprocal rotator 606 and reciprocal rotator 608. A non-linear interferometer 410, preferably of the type illustrated in FIG. 5, is disposed adjacent to the second PBS 604 at a side opposite to the non-reciprocal rotator 606 and reciprocal rotator 608. The input port 616a, first PBS 602, second PBS 604, non-reciprocal rotator 606, reciprocal rotator 608 and non-linear interferometer 410 are disposed along a line which defines a main axis or dimension of the optically isolating 1×2 interleaved channel de-multiplexer 304.1.

Also shown in FIG. 6a, as well as in several subsequent figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

A second non-reciprocal optical rotator 622 and a second reciprocal optical rotator 624 are disposed within the apparatus 304.1 as a pair of elements adjacent to a face of the second PBS 604 that does not intersect the main axis of the apparatus (FIG. 6a). A first optical reflector 612 is disposed adjacent to a face of the first PBS 602 that does not intersect the main axis of the apparatus. A second optical reflector 614 is disposed adjacent to the pair of optical rotators 622–624. As shown in FIG. 6a, the optical reflectors 612–614 comprise right-angle prisms, but could also comprise mirrors. Within the optically isolating 1×2 interleaved channel de-multiplexer 304.1 (FIGS. 6a–6d), the first pair of optical rotators 606–608 is disposed such that linearly polarized light passing completely therethrough from right-to-left incurs a 90° polarization rotation whereas linearly polarized light passing completely therethrough from left-to-right does not incur any polarization rotation. Likewise, the second pair of optical rotators 622–624 is disposed such that linearly polarized light passing completely therethrough from bottom-to-top incurs a 90° polarization rotation whereas linearly polarized light passing completely therethrough from top-to-bottom does not incur any polarization rotation. Reciprocal optical rotators and non-reciprocal optical rotators and the optical properties of such components are well-known in the art. For instance the reciprocal optical rotators can comprise half-wave plates and the non-reciprocal rotators can comprise Faraday rotators. One of ordinary skill in the art will readily understand how to configure the pairs of optical rotators so as to comprise the optical properties described above.

The two PBS's 602–604 comprising the apparatus 304.1 each have the property of transmitting signal light comprising a first polarization (p-polarization) therethrough along the main axis whilst simultaneously deflecting signal light comprising a second polarization (s-polarization) to the adjacent optical reflector. Finally, the first output port 616b and the second output port 616c are disposed such that they receive light deflected by the first 612 and second 614 optical reflector, respectively.

Figure 7:
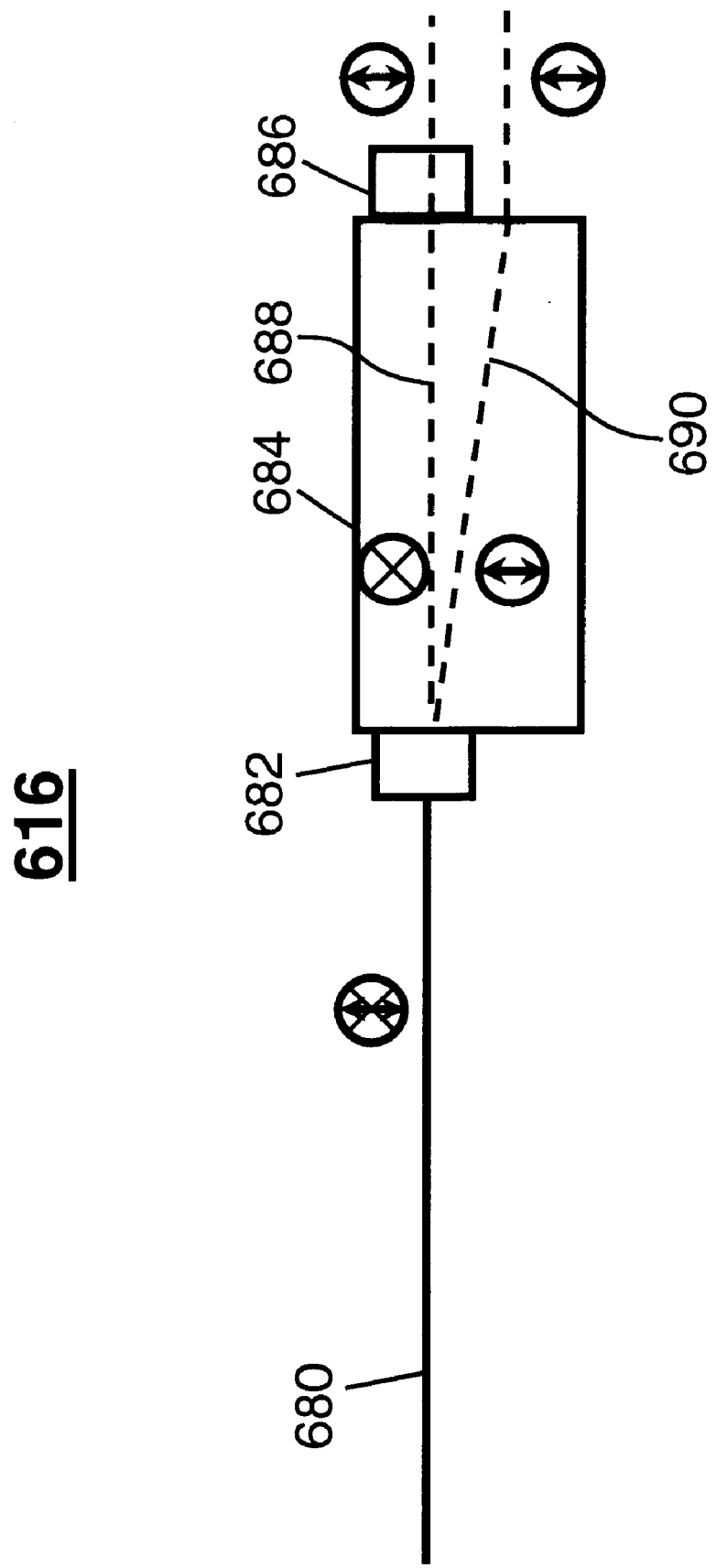
FIG. 7 is a view of an input/output port assembly for use within the optically isolating wavelength division multiplexers and de-multiplexers that may be utilized within an interleaved bi-directional optical amplifier system in accordance with the present invention.

FIG. 7 provides a detailed illustration of the structure of a polarizing port 616, which is utilized either for input or output within the optically isolating 1×2 interleaved channel de-multiplexer 304.1. The port 616 is herein termed a "polarizing port" because said port outputs light comprising only a single linear polarization orientation and can only receive light comprising the same linear polarization orientation. The polarizing port 616 comprises an optical fiber 680, an optical collimator 682, a birefringent walk-off plate 684 and a reciprocal optical rotator 686. The optical collimator 682 is optically coupled to the optical fiber 680 and either receives input from or directs output to the fiber 680. When the optical fiber 680 is utilized to deliver input light, the collimator 682 receives diverging light rays and sets these rays parallel to one another so as to form a light beam. When the optical fiber 680 receives output light, the collimator 682 focuses a beam of collimated light into the end face of the fiber 680.

The birefringent walk-off plate 684 of the polarizing port 616 (FIG. 7) is optically coupled to the collimator 682 at a side opposite to the fiber 680 and has the property of physically separating an unpolarized light beam received from collimator 682 into a deflected light beam 690 and an un-deflected light beam 688. The deflected light 690 comprises an e-ray having a first linear polarization orientation and the un-deflected light 688 comprises an o-ray having a second linear polarization orientation perpendicular to that of the e-ray.

Immediately after passing through the birefringent walk-off plate 684 of the polarizing port 616 (FIG. 7), the two beams 688–690 emerge parallel to one another but have mutually orthogonal polarization orientations. The reciprocal optical rotator 686, which is optically coupled to the birefringent walk-off plate 684 at a side opposite to the collimator 682, is disposed so at to intercept the path of only one of the two beams 688–690. The reciprocal optical rotator 686 rotates the polarization orientation of said intercepted beam by 90° so as to be parallel to that of the other beam. In the reverse light propagation direction, that is, when the polarizing port 616 is utilized as an output port, the optical rotator 686 rotates the polarization orientation of only one of two beams so that said beams subsequently comprise mutually orthogonal polarization orientations and such that these two beams are subsequently combined upon passage through the birefringent walk-off plate 684. The reciprocal optical rotator 686 may be disposed so as to intercept either the o-ray 688 or the e-ray 690.

Referring once again to FIG. 6a, the pathways and polarization orientations of forward propagating input signal rays are shown in both top view (top diagram) and side view (lower diagram). The full set of two input beams, as separated by input port 616a, is only visible in the top view. Signal light, which is comprised of a plurality of wavelength division multiplexed channels $\lambda_1$–$\lambda_n$ is input to the first PBS 602 of optically isolating 1×2 interleaved channel de-multiplexer 304.1 through input port 616a such that the two separated input beams both comprise p-polarization with respect to the first PBS 602. These two p-polarized signal light beams both pass straight through the PBS 602 and subsequently pass through the combination of the first non-reciprocal optical rotator 606 and the first reciprocal optical rotator 608. The first pair of optical rotators 606–608 are disposed within the apparatus 304.1 such that light passing through both from left to right does not experience polarization plane rotation. Thus, the signal light remains p-polarized with respect to the second PBS 604 and passes directly therethrough so as to be input to the non-linear interferometer 410.

The return pathways (that is, the pathways after reflection from and interaction with the non-linear interferometer 410) of odd and even channels through the optically isolating 1×2 interleaved channel de-multiplexer 304.1 are respectively shown in FIG. 6b and FIG. 6c. The non-linear interferometer 410 has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. Thus, as illustrated in the lower diagram of FIG. 6b, the light of the reflected odd channels, whose polarization is not rotated, remains p-polarized with respect to the second PBS 604 and therefore passes without deflection directly through the PBS 604 towards the first reciprocal optical rotator 608 and first non-reciprocal optical rotator 606. Contrariwise, as illustrated in the lower diagram of FIG. 6c, the light of the reflected even channels, whose polarization plane is rotated by 90° upon reflection from the non-linear interferometer 410, is s-polarized with respect to the second PBS 604 and therefore is deflected towards the second non-reciprocal optical rotator 622 and the second reciprocal optical rotator 624.

During passage from right-to-left through the first pair of optical rotators 606–608, the polarization plane orientation of the light of the odd channels (FIG. 6b) is rotated by 90° and thus acquires s-polarization with respect to the first PBS 602. The first PBS 602 therefore deflects this light comprising the odd channels towards the first optical reflector 612. During passage from top-to-bottom through the second pair of optical rotators 622–624, the polarization plane orientation of the light of the even channels (FIG. 6c) is not rotated. This even-channel light passes through the second pair of optical rotators 622–624 and is subsequently reflected by the second reflector 614. Thus, as illustrated in FIG. 6b and FIG. 6c, the odd channels are deflected by first reflector 612 so as to be output to the first output port 616b whereas the even channels are simultaneously deflected by second reflector 614 so as to be output to the second output port 616c. As described previously, the two physically separate beams comprising each set of output channels are recombined by each respective output port and focused into the respective fiber of said port. In this fashion the apparatus 100 behaves as a wavelength division de-multiplexer.

As illustrated in FIG. 6b, it is possible that a small, unwanted proportion 618 of s-polarized signal light may pass straight through the PBS 602 in the direction of port 616a as a result of imperfect separation of polarized light by PBS 602 and/or PBS 604. However, this small, unwanted proportion 618 of light is effectively prevented from being output from optically isolating 1×2 interleaved channel de-multiplexer 304.1 through the port 616a as a result of the fact that the small proportion 618 is polarized perpendicularly to the polarization orientation than can be received by port 616a.

Figure 6D:
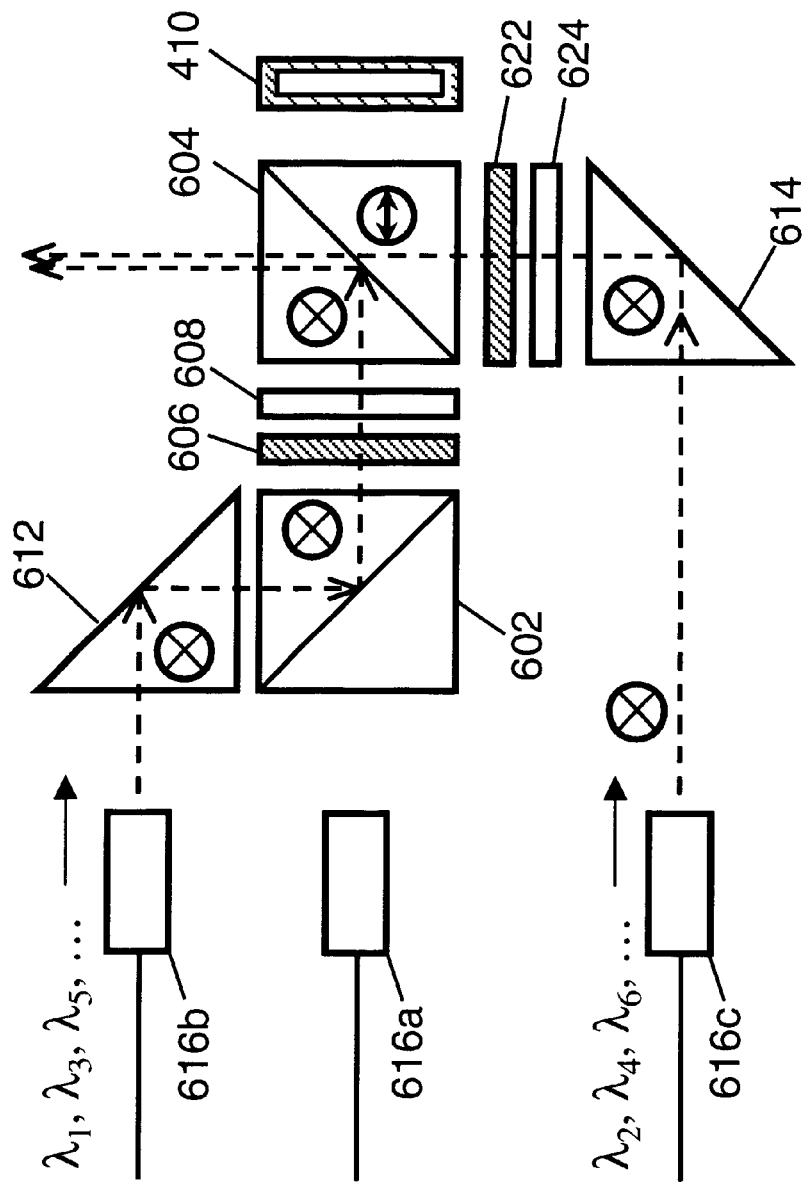
FIG. 6d is a side view of the optically isolating 1×2 interleaved channel de-multiplexer of FIG. 6a, showing the pathways therethrough of inadvertently back-propagating signal lights.
Figure 8A:
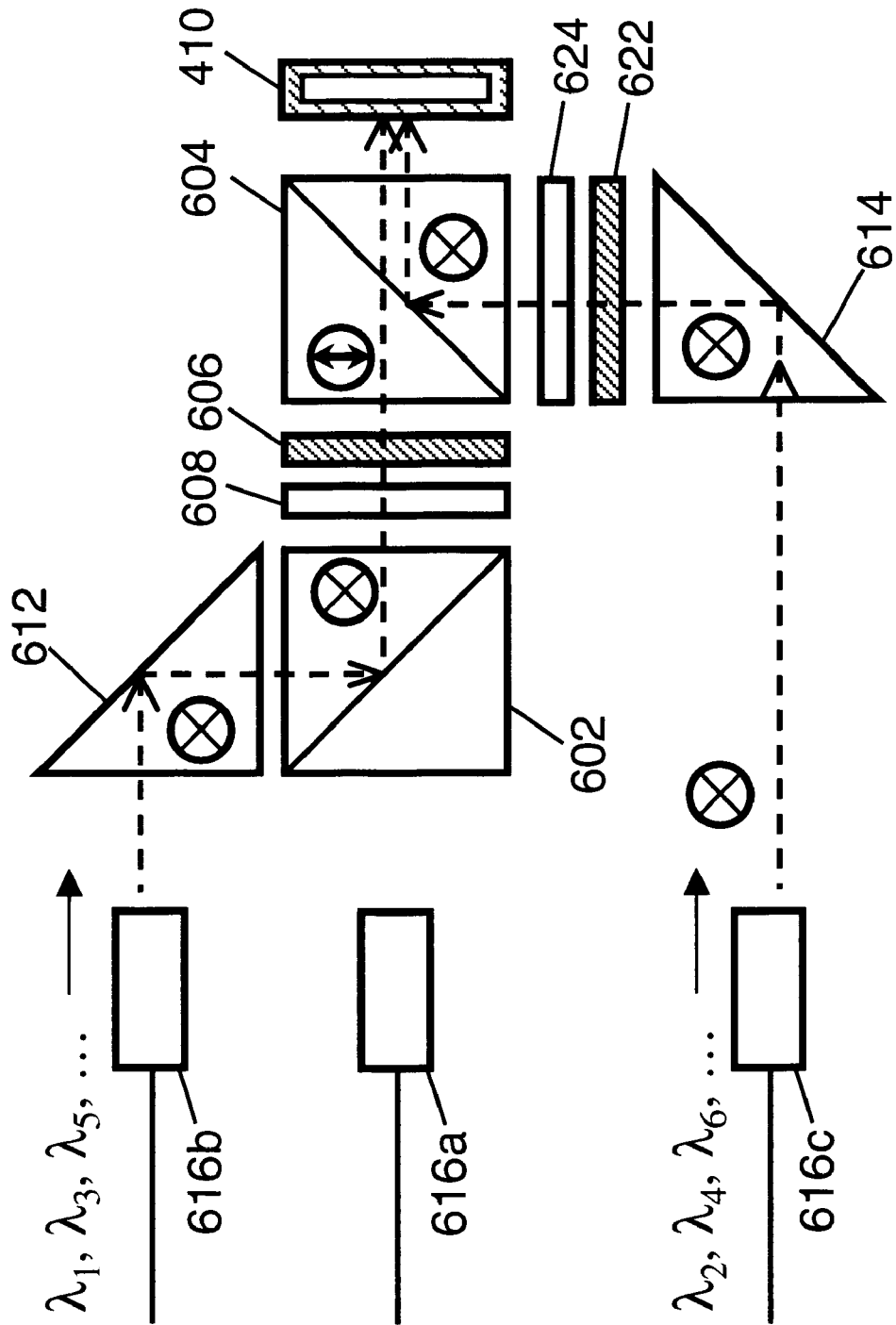
FIG. 8a is a side view of a first optically isolating 2×1 interleaved channel multiplexer that may be utilized within an interleaved bi-directional optical amplifier system in accordance with the present invention showing the forward pathways of signal light rays of even and odd channels therethrough.
Figure 8B:
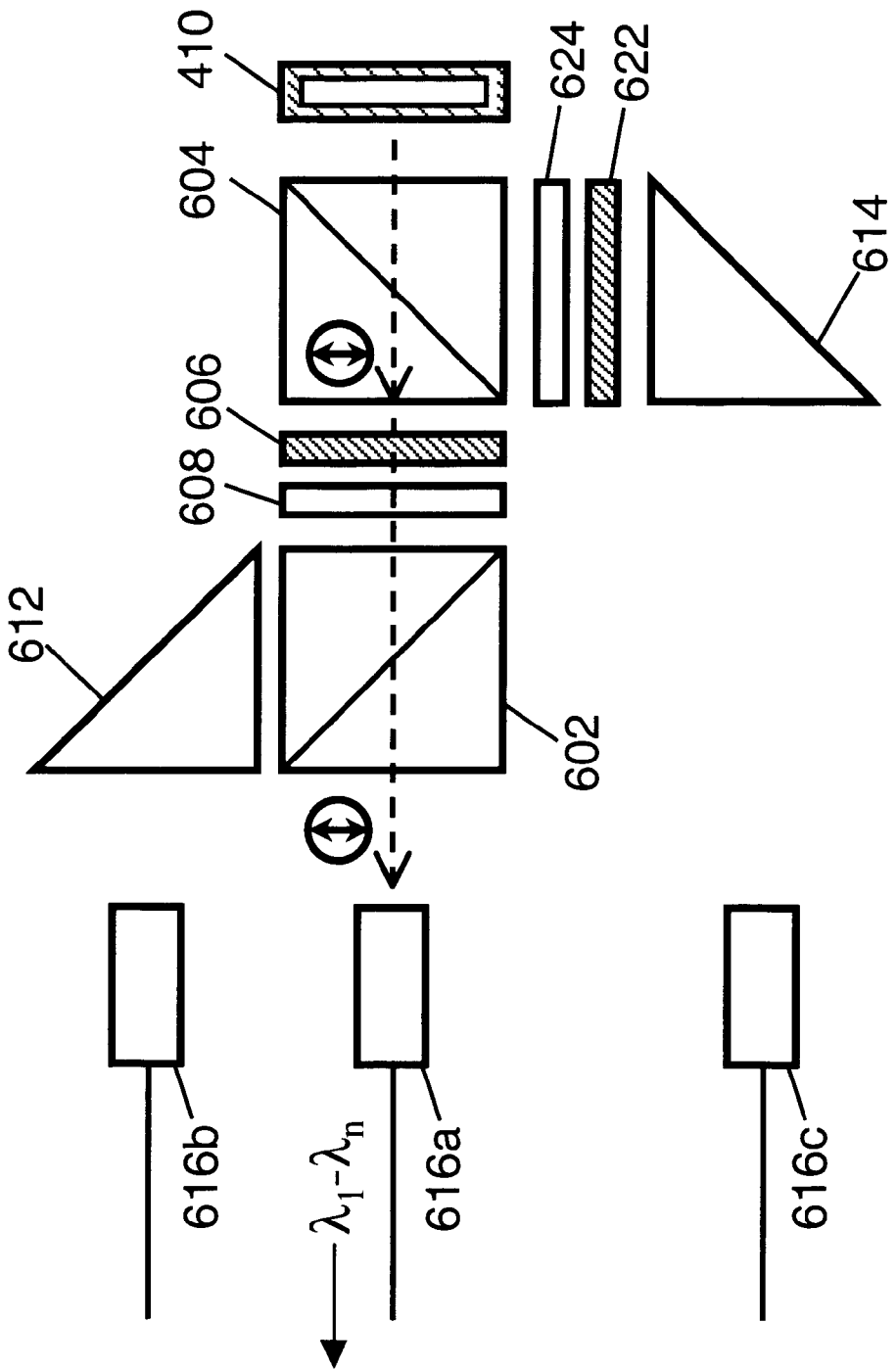
FIG. 8b is a side view of the optically isolating 2×1 interleaved channel multiplexer of FIG. 8a showing the return pathway therethrough of signal light rays of odd channels and of even channels.
Figure 8C:
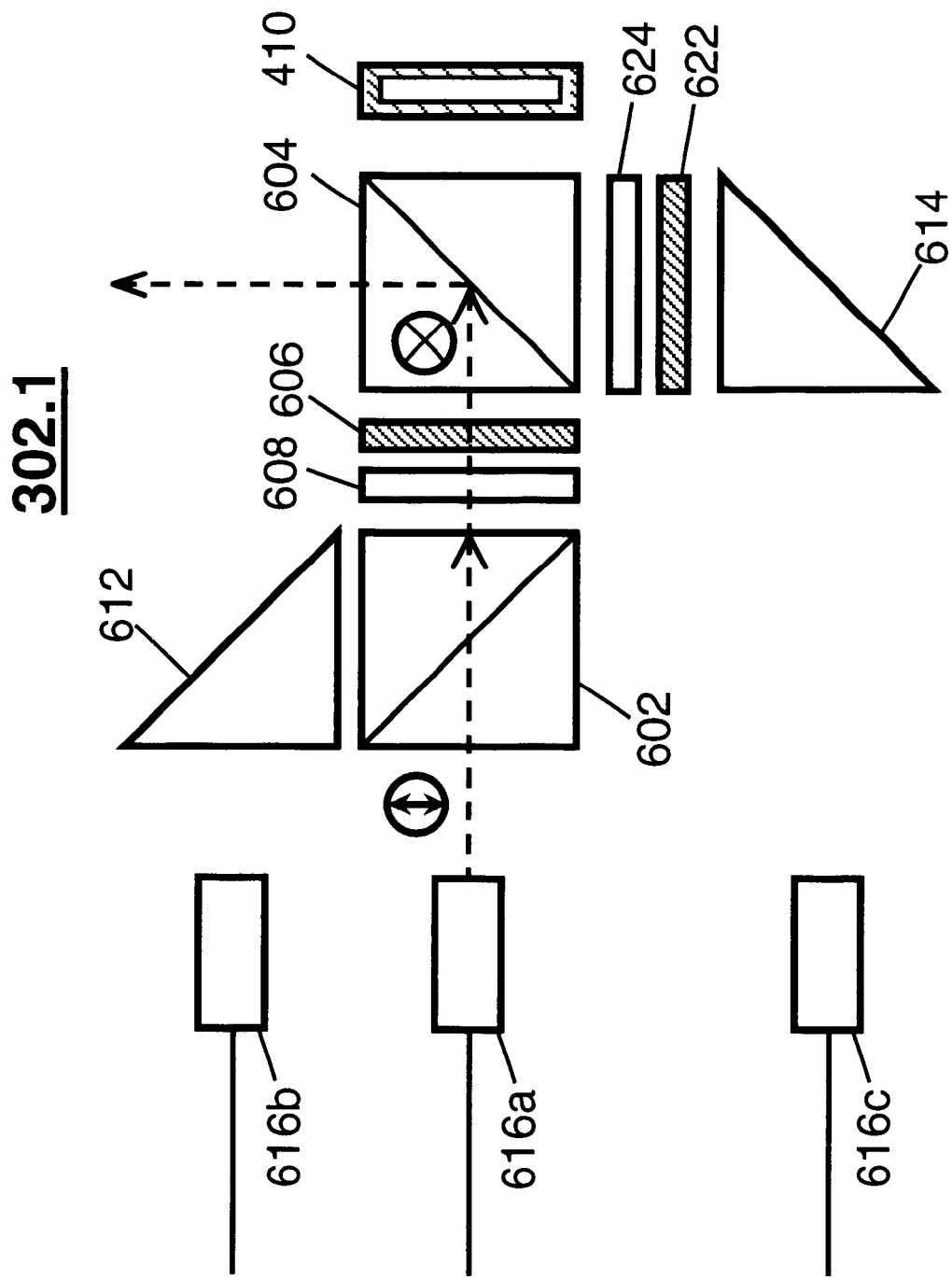
FIG. 8c is a side view of the optically isolating 2×1 interleaved channel multiplexer of FIG. 8a showing the pathways therethrough of inadvertently back-propagating signal lights.

FIG. 6d illustrates the pathways of inadvertently back-propagating signal lights through the optically isolating 1×2 interleaved channel de-multiplexer 304.1. Such inadvertently back-propagating signal lights arise when the de-multiplexer 304.1 receives optical input from either of the output ports 616b–616c. Such inadvertently back-propagating signal lights can be caused, for instance, by reflections or back-scattering occurring from optical components in the output ports or downstream from the output ports. By tracing the polarization of this inadvertently back-propagating signal light through the apparatus 304.1 with reference to FIG. 6d while recognizing the properties of the two PBS's 602–604 and the first pair of optical rotators 606–608 as described above, it is readily apparent that light input from either the port 616b or from the port 616c is prevented from being output from the input port 616a. Therefore the apparatus 304.1 also performs the function of an optical isolator. FIGS. 8a–8c provide an illustration of a first optically isolating 2×1 interleaved channel multiplexer 302.1 that may be utilized within the interleaved bi-directional optical amplifier system 300 (FIG. 3a). The optically isolating 2×1 interleaved channel multiplexer 302.1 (FIGS. 8a–8c), which is disclosed in the above-mentioned co-pending U.S. Patent Application entitled "Multi-Functional Optical Device Utilizing Multiple Polarization Beam Splitters and Non-Linear Interferometers", is identical in construction to optically isolating 1×2 interleaved channel de-multiplexer 304.1 (FIGS. 6a–6d) except that the first pair of optical rotators 606–608 and the second pair of optical rotators 622–624 each functions in the reverse sense from the corresponding pair of rotators in the de-multiplexer 304.1. For example, in the multiplexer 302.1 (FIGS. 8a–8c), the pair of optical rotators 606–608 rotates by 90° the polarization plane of light propagating therethrough from left to right, instead of from right to left as in the de-multiplexer 304.1 (FIGS. 6a–6d). In FIGS. 8a–8c, this reverse-sense operation is illustrated by simple interchange of the positions of the two optical rotators within the first pair of rotators 606–608 and the second pair of optical rotators 622–624. However, one of ordinary skill in the art will readily envision many alternative means of accomplishing the reverse-sense operation of the pairs of optical rotators.

In the 2×1 interleaved channel multiplexer 302.1 (FIGS. 8a–8c), the ports 616b and 616c serve to input signal light comprising odd channels and even channels, respectively, to the apparatus 302.1 and the port 616a serves to output signal light from the apparatus 302.1. Because of the disposition of the rotators 606–608 in multiplexer 302.1, linearly polarized light passing completely through the pair of rotators 606–608 from right to left does not experience polarization plane rotation whereas linearly polarized light passing completely therethrough from left to right incurs a 90°-polarization plane rotation.

FIG. 8a illustrates the forward pathways—that is, pathways up to the non-linear interferometer 410—of signal light rays of both even and odd channels through the multiplexer 302.1. As shown in FIG. 8a, light that is input to multiplexer 302.1 from either of the ports 616b–616c is polarized perpendicularly to the plane of the figure as a result of the polarization functionality of said ports. Light input to multiplexer 302.1 from port 616c comprises s-polarization with respect to the second optical reflector 614 and is deflected by said optical reflector through the second pair of optical rotators 622–624 to the second PBS 604. This signal light does not incur polarization rotation upon passing through the second pair of optical rotators 622–624 comprising the multiplexer 302.1 (FIG. 8a) and thus remains s-polarized with respect to the second PBS 604. This s-polarized even channel signal light is reflected by the second PBS 604 towards the non-linear interferometer 410. Light that is input to multiplexer 302.1 from the port 616b comprises s-polarization with respect to the first optical reflector 612 and the first PBS 602. This light is thus deflected by both the optical reflector 612 and the first PBS 602 towards and through the first reciprocal optical rotator 608 and the first non-reciprocal optical rotator 606 to the second PBS 604. Because the polarization plane of the linearly polarized signal light comprising the odd channels is rotated by 90° upon passing through rotators 606–608 from left to right, this signal light is transformed to p-polarized light with respect to the second PBS 604 and is thus transmitted through PBS 604 towards the non-linear interferometer 410.

FIG. 8b illustrates the return pathways—that is, pathways subsequent to reflection from the non-linear interferometer 410—of signal light rays of odd channels and even channels through the multiplexer 302.1. Upon interaction with and reflection from the non-linear interferometer 410, the polarization plane of the signal light comprising the even channels is rotated so as to become vertically polarized whilst the polarization plane of the signal light comprising the odd channels remains vertically polarized. Therefore, as shown in FIG. 8b, the combined light comprising the odd and the even channels is reflected from non-linear interferometer 410 with vertical polarization. This vertically polarized light comprises p-polarization with respect to the second PBS 604 and thus passes completely through the second PBS 604 towards and through the first non-reciprocal optical rotator 606 and the first reciprocal optical rotator 608. In the multiplexer 302.1, the pair of components 606–608 comprises the property such that linearly polarized light passing completely therethrough from right to left does not incur polarization plane rotation and thus the returning signal light remains p-polarized with respect to the first PBS 602. As shown in FIG. 8b, this p-polarized combined signal light of odd and even channels is transmitted completely through the first PBS 602 so as to be output from the multiplexer 302.1 through the port 616a. In this fashion, the apparatus 302.1 performs as a multiplexer, such that odd channels input from port 616b and even channels input from port 616c are all output from the single port 616a.

FIG. 8c illustrates the pathways of inadvertently back-propagating signal lights through the optically isolating 2×1 interleaved channel multiplexer 302.1. By tracing the polarization of this inadvertently back-propagating signal light through the apparatus 302.1 with reference to FIG. 8c while recognizing the properties of the two PBS's 602–604 and the first pair of optical rotators 606–608 as described above, it is readily apparent that this light input from port 616a is prevented from being output from either of the ports 616b–616c. Therefore the multiplexer 302.1 also performs the function of an optical isolator.

Figure 9A:
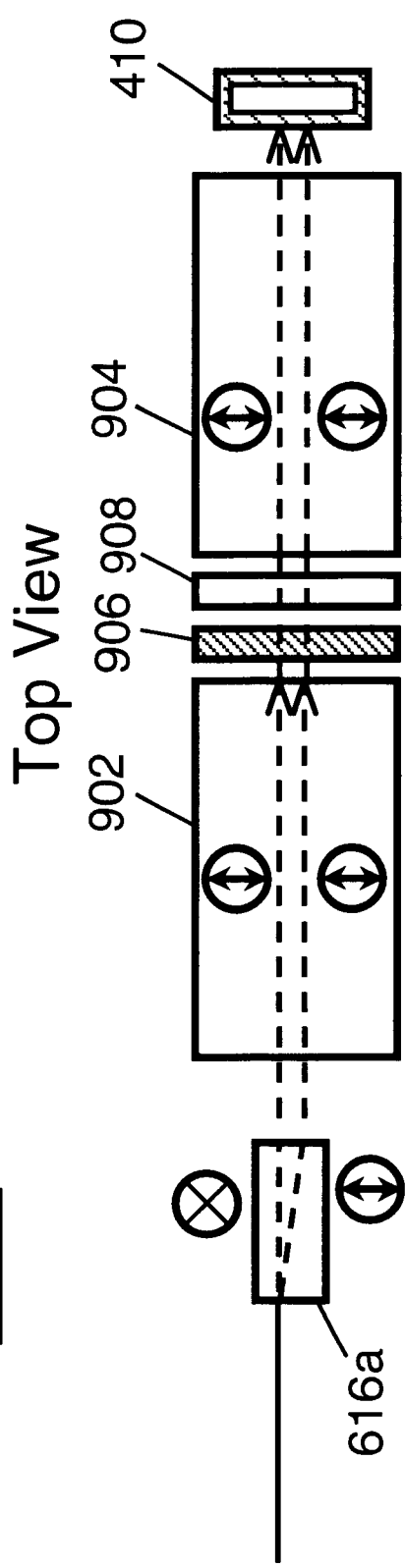
FIG. 9a is a top view and a side view of a second optically isolating 1×2 interleaved channel de-multiplexer that may be utilized within an interleaved bi-directional optical amplifier system in accordance with the present invention showing the forward pathways of signal light rays of odd and even channels therethrough.
Figure 9A:
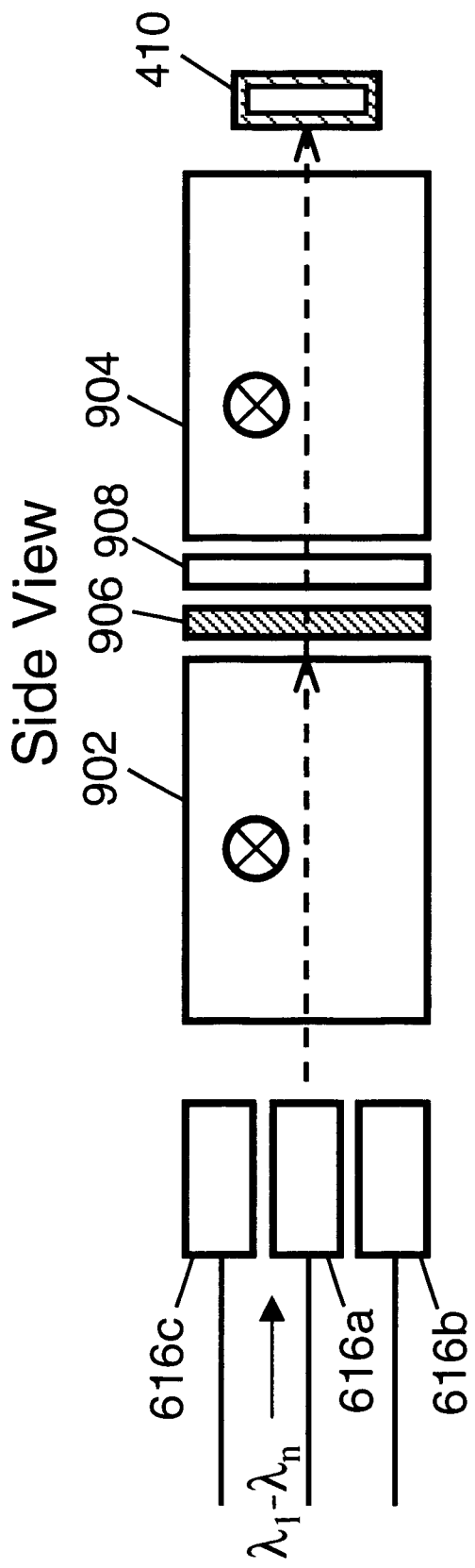

FIGS. 9a–9d provide an illustration of a second optically isolating 1×2 interleaved channel de-multiplexer 304.2 that may be utilized within the interleaved bi-directional optical amplifier system 300 (FIG. 3a) or the interleaved bi-directional optical amplifier system 350 (FIG. 3b). The de-multiplexer 304.2 illustrated in FIGS. 9a–9d is disclosed in a co-pending U.S. Patent application assigned to the present applicant entitled "Multi-Function Optical Device Utilizing Multiple Birefringent Plates and a Non-Linear Interferometer", Ser. No. 09/645,232, filed Aug. 24, 2000. Applicant incorporates this co-pending patent application herein by reference in its entirety. The optically isolating 1×2 interleaved channel de-multiplexer 304.2 receives input from a first polarizing port 616a and separates the channels therein into a first set of channels and a second set of channels, wherein the first and second sets of channels are interleaved with one another and wherein the first set of channels is output from a first polarizing output port 616b and the second set of channels is output from a second polarizing output port 616c. The polarizing ports 616a–616c are preferably of the type illustrated in FIG. 7. As shown in FIG. 9a, the optically isolating 1×2 interleaved channel de-multiplexer 304.2 comprises a first 902 and a second 904 birefringent walk-off plate (or, simply termed, "birefringent plate") between which are disposed a non-reciprocal optical rotation element 906 and a reciprocal optical rotation element 908. The first birefringent plate 902 receives optical input from the input port 616a which is disposed adjacent to a side of the birefringent plate 902 opposite to the non-reciprocal rotator 906 and reciprocal rotator 908. A non-linear interferometer 410, preferably of the type illustrated in FIG. 5, is disposed adjacent to the second birefringent plate 904 at a side opposite to the non-reciprocal rotator 906 and reciprocal rotator 908. Finally, the first output port 616b and the second output port 616c are disposed to either side of the input port 616a, wherein all three said ports face the same side of the first birefringent plate 902. The input port 616a, first birefringent plate 902, second birefringent plate 904, non-reciprocal rotator 906, reciprocal rotator 908 and non-linear interferometer 410 are disposed along a line which defines a main axis or dimension of the optically isolating 1×2 interleaved channel de-multiplexer 304.2.

The two birefringent walk-off plates 902–904 (FIG. 9a) each have the property of transmitting signal light comprising a first polarization (o-ray) therethrough substantially parallel to the main axis whilst simultaneously causing a deflection or offset of a signal light comprising a second polarization (e-ray). The path of the e-ray is deflected within either birefringent plate but is substantially parallel to (thereby offset from) that of the o-ray immediately upon exiting the plate. The optical axes of the two birefringent plates 902–904 are disposed such that, for e-rays passing sequentially through both such birefringent plates in a same direction, the offset of the e-ray immediately caused by passage through the second such birefringent plate is equal and opposite to the offset of the e-ray immediately caused by the passage through the first birefringent plate. As oriented in FIG. 9a and following figures, the e-rays and o-rays are polarized vertically and horizontally, respectively, during their traverses through the birefringent plates 902–904.

Referring once again to FIG. 9a, the pathways and polarization orientations of forward propagating input signal rays are shown in both top view (top diagram) and side view (lower diagram). The complete set of two input beams, as separated by input port 616a, is only visible in the top view.

Signal light, which is comprised of a plurality of wavelength division multiplexed channels $\lambda_1$–$\lambda_n$, is input to the first birefringent plate 902 of optically isolating 1×2 interleaved channel de-multiplexer 304.2 through input port 616a such that the two separated input beams both comprise undeflected o-rays with respect to the first birefringent plate 902. This signal light subsequently passes through the birefringent plate 902 and then through the non-reciprocal optical rotator 906 and the reciprocal optical rotator 908. The elements 906–908 are disposed such that light passing through both from left to right does not experience polarization plane rotation. Therefore, the light of the channels $\lambda_1$–$\lambda_n$ remains as o-rays within the second birefringent plate 904 and passes undeflected through the plate 904 to the non-linear interferometer 410.

Figure 9B:
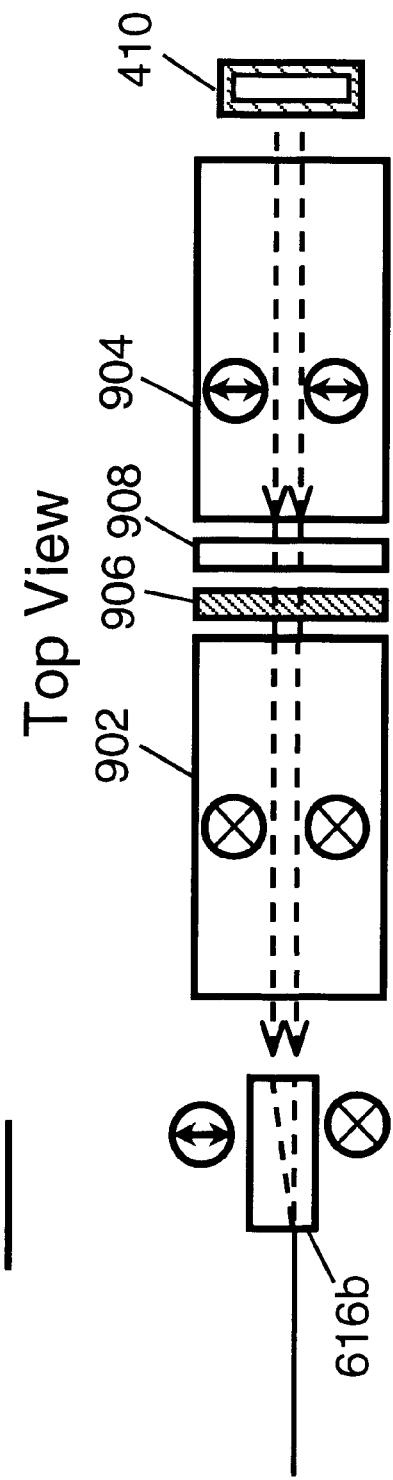
FIG. 9b is a top view and a side view of the optically isolating 1×2 interleaved channel de-multiplexer of FIG. 9a showing the return pathways of signal light rays of odd channels therethrough.
Figure 9B:
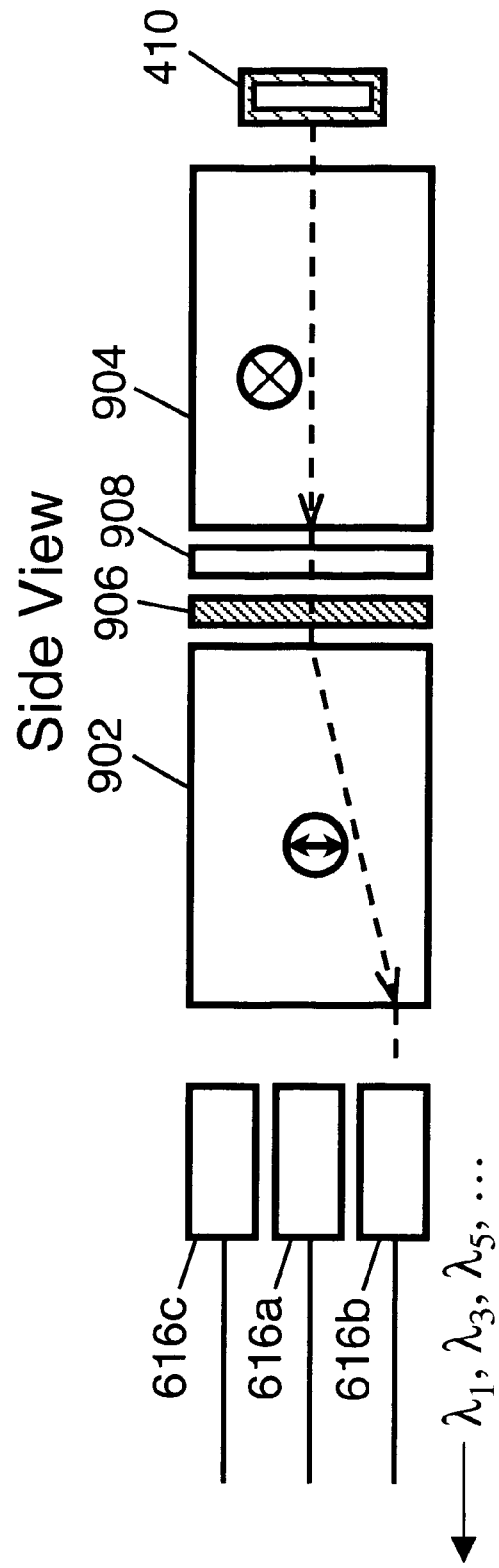
Figure 9C:
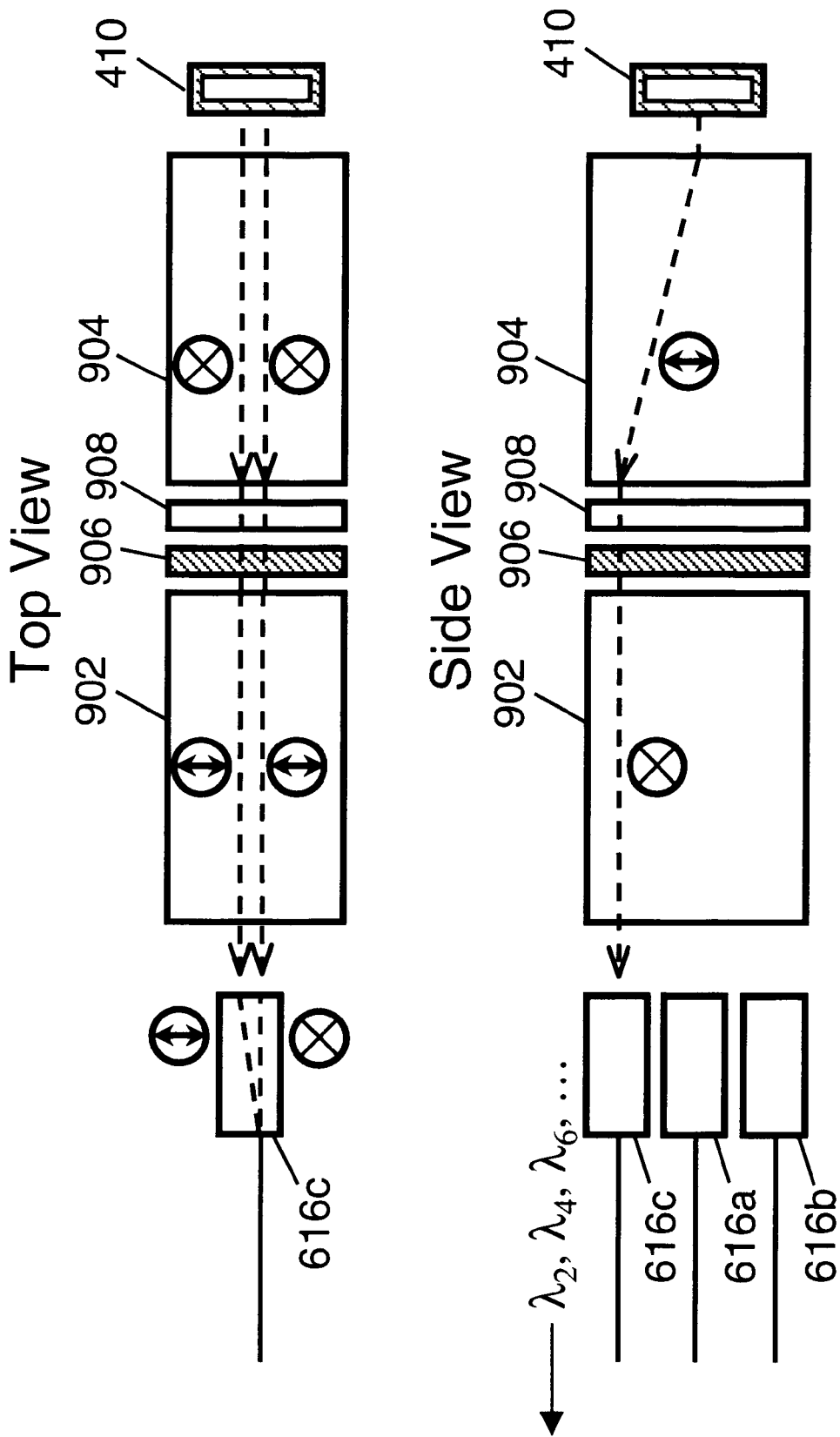
FIG. 9c is a top view and a side view of the optically isolating 1×2 interleaved channel de-multiplexer of FIG. 9a showing the return pathways of signal light rays of even channels therethrough.

The return pathways (that is, the pathways after reflection from and interaction with the non-linear interferometer 410) of odd and even channels through the optically isolating 1×2 interleaved channel de-multiplexer 304.2 are respectively shown in FIG. 9b and FIG. 9c. As illustrated in the lower diagram of FIG. 9b, the light of the reflected odd channels, whose polarization is not rotated by the non-linear interferometer 410, remains polarized as an o-ray with respect to the second birefringent plate 904 and therefore passes without deflection directly through the birefringent plate 904 towards the reciprocal optical rotator 908 and non-reciprocal optical rotator 906. Contrariwise, as illustrated in the lower diagram of FIG. 9c, the light of the reflected even channels, whose polarization plane is rotated by 90° upon reflection from non-linear interferometer 410, is polarized as an e-ray with respect to the second birefringent plate 904 and therefore is deflected.

During passage from right-to-left through the pair of elements 906–908, the polarization plane orientation of the light of the odd channels (FIG. 9b) and of the even channels (FIG. 9c) is rotated by 90°. The light of the odd channels and of the even channels thus becomes polarized as an e-ray and as an o-ray, respectively, within the first birefringent plate 902. The first birefringent plate 902 therefore deflects the light comprising the odd channels (FIG. 9b) but allows the light comprising the even channels (FIG. 9c) to pass directly therethrough without deflection.

The optic axes of the two birefringent plates 902–904 are not parallel to one another but are, instead, symmetrically oriented with respect to one another about a vertical plane perpendicular to the axis of device 304.2. Because of this disposition of the two optic axes, the offsets of odd channels polarized as e-rays in birefringent plate 902 and of even channels polarized as e-rays in birefringent plate 904 are opposite to one another as illustrated in FIG. 9b and FIG. 9c.

Subsequent to passing through the birefringent plate 902 in the return direction, the odd channels and even channels are directed to the first output port 616b and to the second output port 616c, respectively, as illustrated in FIGS. 9b–9c. As described previously, the two physically separate beams comprising each set of output channels are recombined by each respective output port and focused into the respective fiber of said port. The first input port 616b (second input port 616c) is disposed so as to only receive vertically (horizontally) polarized light and thus receives the vertically (horizontally) polarized light of the odd channels (even channels) upon exit of this light from the birefringent plate 902. In this fashion the apparatus 304.2 behaves as a wavelength division de-multiplexer.

Figure 9D:
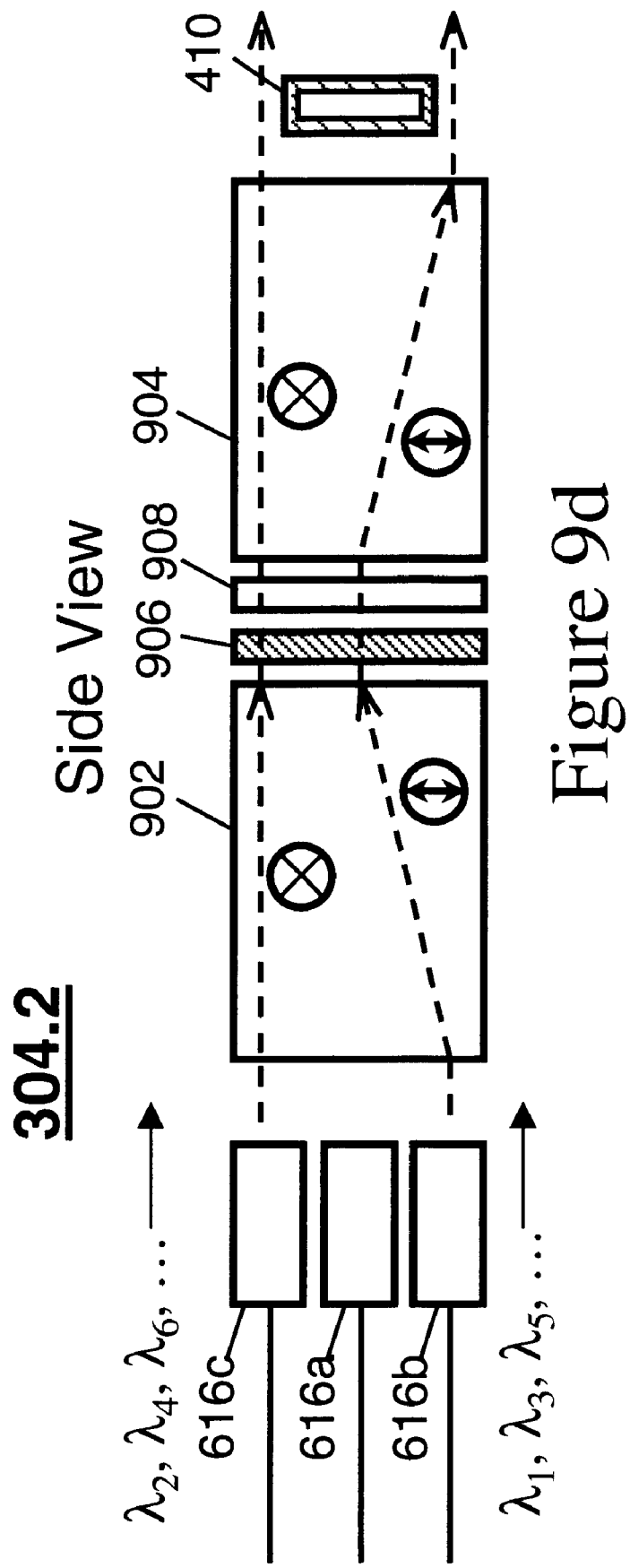
FIG. 9d is a side view of the optically isolating 1×2 interleaved channel de-multiplexer of FIG. 9a showing the pathways therethrough of inadvertently back-propagating light rays of odd channels and of even channels.

FIG. 9d illustrates the pathways of inadvertently reflected or backward propagating signal light rays of the odd channels and the even channels through the optically isolating 1×2 interleaved channel de-multiplexer 304.2. Such backward propagating light is polarized vertically upon being output from port 616b or horizontally upon being output from port 616c (FIG. 9d). The backward propagating light emitted or reflected from port 616b and 616c subsequently passes through the first birefringent plate as a deflected e-ray or as an undeflected o-ray (FIG. 9d), respectively, and passes through the non-reciprocal optical rotator 906, the reciprocal optical rotator 908 and the second birefringent plate 904 in this order. Upon passing through the rotators 906–908 from left to right, the backward propagating light of the odd channels and of the even channels does not incur polarization rotation and thus remains vertically and horizontally polarized, respectively. Thus, the backward propagating light of the odd channels and of the even channels remains polarized as a deflected e-ray and as an undeflected o-ray, respectively, within the second birefringent plate 904. Because of the disposition of the optic axes of the two birefringent plates 902–904, there is no net offset of either light upon passing completely through the birefringent plate 902, the non-reciprocal optical rotator 906, the reciprocal optical rotator 908 and the second birefringent plate 904 in this order (FIG. 9d). The inadvertently reflected or backward propagating light thus exits the apparatus and is prevented from being directed to the port 616a. In this fashion, the optically isolating 1×2 interleaved channel de-multiplexer 304.2 performs the function of an optical isolator.

Figure 10C:
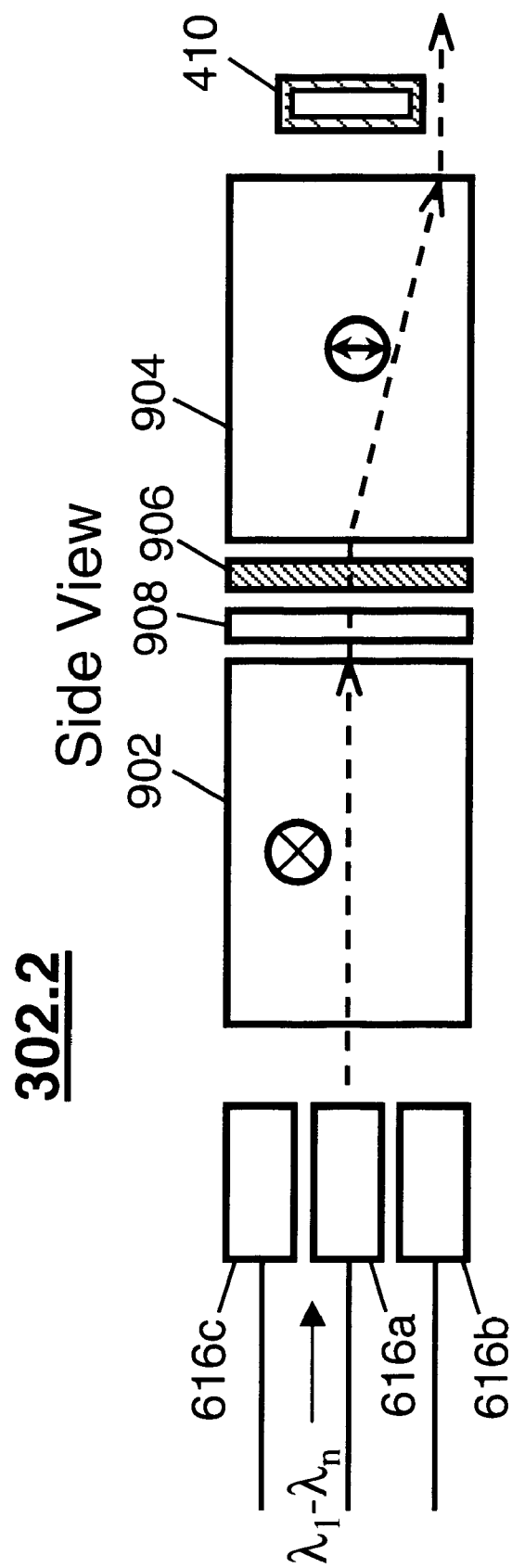
FIG. 10c is a side view of the optically isolating 2×1 interleaved channel multiplexer of FIG. 10a showing the pathways therethrough of inadvertently back-propagating signal light.

FIGS. 10a–10c illustrate a second optically isolating 2×1 interleaved channel multiplexer 302.2 that may be utilized within the interleaved bi-directional optical amplifier system 300 (FIG. 3a). The multiplexer 302.2 illustrated in FIGS. 10a–10c comprises all the components and dispositions previously described in reference to the optically isolating 1×2 interleaved channel de-multiplexer 304.2 (FIGS. 9a–9d) except that the pair of optical rotators 906–908 functions in the reverse sense from the corresponding pair of rotators in the de-multiplexer 304.2. In FIGS. 10a–10c, this reverse-sense operation is illustrated by simple interchange of the positions of the two optical rotators within the pair of rotators 906–908. However, one of ordinary skill in the art will readily envision many alternative means of accomplishing the reverse-sense operation of the pair of optical rotators. In the multiplexer 302.2 (FIGS. 10a–10c), the ports 616b and 616c serve to input signal light comprising odd channels and even channels, respectively, to the apparatus 302.2 and the port 616a serves to output signal light from the apparatus. Because of the disposition of the rotators 906–908 in multiplexer 302.2, linearly polarized light passing completely through the pair of rotators 906–908 from right to left does not experience polarization plane rotation whereas linearly polarized light passing completely therethrough from left to right incurs a 90°-polarization plane rotation.

FIG. 10a illustrates the forward pathways—that is, pathways up to the non-linear interferometer 410—of signal light rays of both even and odd channels through the multiplexer 302.2. As shown in FIG. 10a, light that is input to multiplexer 302.2 from the port 616b and the port 616c is polarized vertically and horizontally, respectively, as a result of the polarization functionality of said ports. Light input to multiplexer 302.2 from either of the ports 616b–616c passes through the first birefringent plate 902, the reciprocal optical rotator 908, the non-reciprocal optical rotator 906 and the second birefringent plate 904 in this order and then to the non-linear interferometer 410. The odd-channel signal light 952a and the even-channel signal light 952b comprise a deflected e-ray and an undeflected o-ray, respectively, within the first birefringent plate 902 as shown in FIG. 10*a*. Subsequently, both the odd-channel signal light 952*a* and the even-channel signal light 952*b* passes through the reciprocal optical rotator 908 and the non-reciprocal optical rotator 906 from left to right. Therefore, the polarization plane of the odd-channel signal light 952*a* and the even-channel signal light 952*b* is rotated so as to pass through the second birefringent plate as a horizontally-polarized, un-deflected o-ray and as a vertically polarized deflected e-ray, respectively (FIG. 10*a*). Because of the opposing nature of the deflection of the odd channels in the first birefringent plate 902 and of the even channels in the second birefringent plate 904, the pathways of the odd and even channels are combined immediately upon exit from the second birefringent plate 904 and just prior to being reflected from the non-linear interferometer 410 (FIG. 10*a*).

FIG. 10*b* illustrates the return pathways—that is, pathways subsequent to reflection from the non-linear interferometer 410—of signal light rays of odd channels and even channels through the multiplexer 302.2. Upon interaction with and reflection from the non-linear interferometer 410 the polarization plane of the signal light comprising the even channels is rotated so as to become horizontally polarized whilst the polarization plane of the signal light comprising the odd channels remains horizontally polarized. Therefore, as shown in FIG. 10*b*, the combined signal light 952*a*–952*b* comprising the odd and the even channels is reflected from non-linear interferometer 410 with horizontal polarization. This horizontally polarized combined light comprises o-rays within the second birefringent plate 904 and thus passes completely through the second birefringent plate 904 towards and through the non-reciprocal optical rotator 906 and the reciprocal optical rotator 908. In the multiplexer 302.2, the pair of components 906–908 comprises the property such that linearly polarized light passing completely therethrough from right to left does not incur polarization plane rotation. Thus the returning signal light 952*a*–952*b* remains as horizontally polarized o-rays within the first birefringent plate 902. As shown in FIG. 10*b*, this horizontally polarized combined signal light of odd and even channels is transmitted completely through the first birefringent plate 902 so as to be output from the multiplexer 302.2 through the port 616*a*. In this fashion, the apparatus 302.2 performs as a multiplexer, such that odd channels input from port 616*b* and even channels input from port 616*c* are all output from the single port 616*a*.

FIG. 10*c* illustrates the optical isolator functionality of the multiplexer 302.2 by showing the pathways therethrough of signal light rays inadvertently input to the apparatus from port 616*a*. As shown in FIG. 10*c*, such light rays are delivered from port 616*a* with horizontal polarization. Since this horizontally polarized light comprises an o-ray within the first birefringent plate 902, this inadvertently input signal light passes undeflected through the first birefringent plate 902 to and through the pair of optical rotators 906–908. In the multiplexer 302.2, the pair of optical rotators 906–908 comprises the property such that linearly polarized light passing completely therethrough from left to right incurs a 90°-polarization plane rotation. Therefore, upon passing through the pair of optical rotators 906–908, the inadvertently input signal light is transformed to a vertically polarized e-ray within the second birefringent plate 904. As is shown in FIG. 10*c*, the second birefringent plate 904 deflects this vertically polarized light so that it exits the apparatus without entering either of the ports 616*b*–616*c*. In this fashion, the multiplexer 302.2 performs as an optical isolator.

A bi-directional optical amplifier system and a method for bi-directional optical amplification of wavelength division multiplexed optical signals have been disclosed. In an exemplary embodiment, the bidirectional amplifier system of the present invention comprises a 2×2 interleaved channel separator optically coupled to both a first and a second bidirectional fiber optic communications line and an optical amplifier optically coupled to the 2×2 interleaved channel separator.

Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the invention as defined in the appended claims.

What is claimed is:

1. A system for amplification of wavelength division multiplexed optical signals, comprising:

an optical amplifier;

an interleaved channel separator optically coupled to the optical amplifier; and a first and a second fiber optic communications line optically coupled to the interleaved channel separator, wherein a first plurality of optical channels propagates in a first direction and a second plurality of optical channels propagates in a second direction opposite to the first direction within each of the first and second fiber optic communications lines, wherein the first plurality of channels and the second plurality of channels are interleaved with one another.

2. The system of claim 1, wherein the interleaved channel separator comprises:

a first port for inputting the first plurality of optical channels from the first fiber optic communications line and for outputting the second plurality of optical channels to the first fiber optic communications line;

a second port for inputting the second plurality of optical channels from the second fiber optic communications line and for outputting the first plurality of optical channels to the second fiber optic communications line;

a third port optically coupled to the input of the optical amplifier; and a fourth port optically coupled to the output of the optical amplifier.

3. The system of claim 2, wherein the interleaved channel separator comprises:

at least one first lens optically coupled to the first port and to the third port;

at least one second lens optically coupled to the second port and to the fourth port;

a polarization beam splitter optically coupled to the at least one first lens and the at least one second lens; and at least two nonlinear interferometers optically coupled to the polarization beam splitter.

4. The system of claim 3, wherein the nonlinear interferometers each comprise:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

5. The system of claim 1, wherein the optical amplifier comprises an erbium-doped optical amplifier.

6. The system of claim 1, wherein the optical amplifier comprises a semiconductor optical amplifier.

7. A system for amplification of wavelength division multiplexed optical signals, comprising:

an optical amplifier;

an optically isolating interleaved channel multiplexer (isolating MUX) optically coupled to the input of the optical amplifier;

an optically isolating interleaved channel de-multiplexer (isolating DEMUX) optically coupled to the output of the optical amplifier;

a first and a second interleaved channel separator each optically coupled to the isolating MUX and to the isolating DEMUX;

a first fiber optic communications line optically coupled to the first interleaved channel separator; and a second fiber optic communications line optically coupled to the second interleaved channel separator, wherein a first plurality of optical channels propagates in a first direction and a second plurality of optical channels propagates in a second direction opposite to the first direction within each of the first and second fiber optic communications lines, wherein the first plurality of channels and the second plurality of channels are interleaved with one another.

8. The system of claim 7, wherein the first and the second interleaved channel separator each comprises:

a first port for inputting one of the first plurality and the second plurality of optical channels of channels from a fiber optic communications line and for outputting the other one of the first plurality and the second plurality of optical channels to the same fiber optic communications line;

a second port optically coupled to an input of the isolating MUX; and a third port optically coupled to an output of the isolating DEMUX.

9. The system of claim 8, wherein each of the first and the second 1×2 interleaved channel separators comprises:

at least one first lens optically coupled to the first port and to one of the second and third ports;

at least one second lens optically coupled to another of the second and third ports;

a polarization beam splitter optically coupled to the at least one first lens and the at least one second lens; and at least two nonlinear interferometers optically coupled to the polarization beam splitter.

10. The system of claim 9, wherein the nonlinear interferometers each comprise:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

11. The system of claim 7, wherein the isolating DEMUX comprises:

a first polarization beam splitter (PBS);

a first set of optical rotators optically coupled to the first PBS, the first set of optical rotators comprising a first non-reciprocal optical rotator (NRR) and a first reciprocal optical rotator (RR);

a second PBS optically coupled to the first set of optical rotators at a side opposite to the first PBS;

a non-linear interferometer optically coupled to the second PBS at a side opposite to the first set of optical rotators;

a second set of optical rotators optically coupled to the second PBS, the second set of optical rotators comprising a second NRR and a second RR; and a plurality of optical ports, wherein each of the plurality of ports comprises:

an optical collimator;

a birefringent walk-off plate optically coupled to the optical collimator; and an input reciprocal optical rotator intercepting a portion of a light from the birefringent walk-off plate.

12. The system of claim 11, wherein the nonlinear interferometer comprises:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

13. The system of claim 7, wherein the isolating MUX comprises:

a first polarization beam splitter (PBS);

a first set of optical rotators optically coupled to the first PBS, the first set of optical rotators comprising a first non-reciprocal optical rotator (NRR) and a first reciprocal optical rotator (RR);

a second PBS optically coupled to the first set of optical rotators at a side opposite to the first PBS;

a non-linear interferometer optically coupled to the second PBS at a side opposite to the first set of optical rotators;

a second set of optical rotators optically coupled to the second PBS, the second set of optical rotators comprising a second NRR and a second RR; and a plurality of optical ports, wherein each of the plurality of ports comprises:

an optical collimator;

a birefringent walk-off plate optically coupled to the optical collimator; and an input reciprocal optical rotator intercepting a portion of a light from the birefringent walk-off plate.

14. The system of claim 13, wherein the nonlinear interferometer comprises:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

15. The system of claim 7, wherein the isolating DEMUX comprises:

a first birefringent plate;

a pair of optical rotators optically coupled to the first birefringent plate, the pair of optical rotators comprising a non-reciprocal optical rotator and a reciprocal optical rotator;

a second birefringent plate optically coupled to the pair of optical rotators at a side opposite to the first birefringent plate;

a non-linear interferometer optically coupled to the second birefringent plate at a side opposite to the pair of optical rotators; and a plurality of optical ports, wherein each of the plurality of ports comprises:
an optical collimator;
a birefringent walk-off plate optically coupled to the optical collimator; and
an input reciprocal optical rotator intercepting a portion of a light from the birefringent walk-off plate.

16. The system of claim 15, wherein the nonlinear interferometer comprises:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

17. The system of claim 7, wherein the isolating MUX comprises:

a first birefringent plate;

a pair of optical rotators optically coupled to the first birefringent plate, the pair of optical rotators comprising a non-reciprocal optical rotator and a reciprocal optical rotator;

a second birefringent plate optically coupled to the pair of optical rotators at a side opposite to the first birefringent plate;

a non-linear interferometer optically coupled to the second birefringent plate at a side opposite to the pair of optical rotators; and a plurality of optical ports, wherein each of the plurality of ports comprises:
an optical collimator;
a birefringent walk-off plate optically coupled to the optical collimator; and
an input reciprocal optical rotator intercepting a portion of a light from the birefringent walk-off plate.

18. The system of claim 17, wherein the nonlinear interferometer comprises:

a first glass plate optically coupled to a second glass plate, forming a cavity;

a first reflective coating residing inside the cavity and on the second glass plate;

a second reflective coating residing inside the cavity and on the first glass plate;

a first waveplate residing inside the cavity between the first and second glass plates; and a second waveplate optically coupled to the first glass plate.

19. The system of claim 7, wherein the optical amplifier comprises an erbium-doped optical amplifier.

20. The system of claim 7, wherein the optical amplifier comprises a semiconductor optical amplifier.

21. The system of claim 7, wherein a port of the first interleaved channel separator receives the first plurality of optical channels from the first fiber optic communications line and outputs the second plurality of optical channels to the first fiber optic communications line, a port of the second interleaved channel separator receives the second plurality of optical channels from the second fiber optic communications line and outputs the first plurality of optical channels to the second fiber optic communications line, a port of the isolating MUX outputs the first plurality and the second plurality of optical channels to the input of the optical amplifier, and a port of the isolating DEMUX receives an output from the optical amplifier.

22. A system for amplification of wavelength division multiplexed optical signals, comprising:

an optical amplifier;

an optically isolating interleaved channel de-multiplexer (isolating DEMUX) optically coupled to the output of the optical amplifier;

a first and a second interleaved channel separator each optically coupled to the isolating DEMUX;

an optical combiner optically coupled to the first and second interleaved channel separators and to the input of the optical amplifier;

a first fiber optic communications line optically coupled to the first interleaved channel separator; and a second fiber optic communications line optically coupled to the second interleaved channel separator, wherein a first plurality of optical channels propagates in a first direction and a second plurality of optical channels propagates in a second direction opposite to the first direction within each of the first and second fiber optic communications lines, wherein the first plurality of channels and second plurality of channels are interleaved with one another.

23. A method for optical amplification of a first plurality of optical channels propagating in a first direction and a second plurality of optical channels that is interleaved with the first plurality propagating in a second direction opposite to the first direction within a fiber optic communications line, comprising the steps of:

inputting the first plurality of optical channels to a first port of an interleaved channel separator from the fiber optic communications line and inputting the second plurality of optical channels to a second port of the interleaved channel separator from a second fiber optic communications line;

outputting the first plurality and the second plurality of optical channels from a third port of the interleaved channel separator to the input of an optical amplifier;

outputting the first plurality and the second plurality of optical channels from the output of the optical amplifier to a fourth port of the interleaved channel separator; and outputting the first plurality of optical channels to the second fiber optic communications line from the second port of the interleaved channel separator and outputting the second plurality of optical channels to the fiber optic communications line from the first port of the interleaved channel separator.

24. The method of claim 23, wherein the optical amplifier comprises an erbium-doped optical amplifier.

25. The method of claim 23, wherein the optical amplifier comprises a semiconductor optical amplifier.

26. The method of claim 23, wherein the interleaved channel separator further comprises:
- at least one first lens optically coupled to the first port and to the third port;
- at least one second lens optically coupled to the second port and to the fourth port;
- a polarization beam splitter optically coupled to the at least one first lens and the at least one second lens; and
- at least two nonlinear interferometers optically coupled to the polarization beam splitter.

27. The method of claim 26, wherein the nonlinear interferometers each comprise:
- a first glass plate optically coupled to a second glass plate, forming a cavity;
- a first reflective coating residing inside the cavity and on the second glass plate;
- a second reflective coating residing inside the cavity and on the first glass plate;
- a first waveplate residing inside the cavity between the first and second glass plates; and
- a second waveplate optically coupled to the first glass plate.

28. A method for optical amplification of a first plurality of optical channels propagating in a first direction and a second plurality of optical channels that is interleaved with the first plurality propagating in a second direction opposite to the first direction within a fiber optic communications line, comprising the steps of:
- inputting the first plurality of optical channels to a first interleaved channel separator from the fiber optic communications line and inputting the second plurality of optical channels to a second interleaved channel separator from a second fiber optic communications line;
- outputting the first plurality of optical channels from the first interleaved channel separator and the second plurality of optical channels from the second interleaved channel separator to an isolating MUX;
- outputting the first plurality and the second plurality of optical channels from the isolating MUX to an input port of an optical amplifier;
- outputting the first plurality and the second plurality of optical channels from the output of the optical amplifier to an isolating DEMUX;
- outputting the second plurality of optical channels from the isolating DEMUX to the first interleaved channel separator and the first plurality of optical channels from the isolating DEMUX to the second interleaved channel separator; and
- outputting the first plurality of optical channels to the second fiber optic communications line from the second interleaved channel separator and outputting the second plurality of optical channels to the fiber optic communications line from the first interleaved channel separator.

29. The method of claim 28, wherein the optical amplifier comprises an erbium-doped optical amplifier.

30. The method of claim 28, wherein the optical amplifier comprises a semiconductor optical amplifier.

31. A method for optical amplification of a first plurality of optical channels propagating in a first direction and a second plurality of optical channels that is interleaved with the first plurality propagating in a second direction opposite to the first direction within a fiber optic communications line, comprising:
- inputting the first plurality of optical channels to a first interleaved channel separator from the fiber optic communications line and inputting the second plurality of optical channels to a second interleaved channel separator from a second fiber optic communications line;
- outputting the first plurality of optical channels from the first interleaved channel separator and the second plurality of optical channels from the second interleaved channel separator to an optical combiner;
- outputting the first plurality and the second plurality of optical channels from the optical combiner to the input of an optical amplifier;
- outputting the first plurality and the second plurality of optical channels from the output of the optical amplifier to an input port of an isolating DEMUX;
- outputting the second plurality of optical channels from the isolating DEMUX to the first interleaved channel separator and the first plurality of optical channels from the isolating DEMUX to the second interleaved channel separator; and
- outputting the first plurality of optical channels to the second fiber optic communications line from the second interleaved channel separator and outputting the second plurality of optical channels to the fiber optic communications line from the first interleaved channel separator.

32. The method of claim 31, wherein the optical amplifier comprises an erbium-doped optical amplifier.

33. The method of claim 32, wherein the optical amplifier comprises a semiconductor optical amplifier.

34. A method for bidirectional optical amplification, comprising:
- receiving a first plurality of channels through a first port and a second plurality of channels through a second port;
- amplifying the first plurality of channels and the second plurality of channels; and
- interleaving the first plurality of channels and the second plurality of channels by outputting the first plurality of channels through the second port and outputting the second plurality of channels through the first port.

* * * * *